(12) United States Patent
Koplow

(10) Patent No.: US 10,879,552 B2
(45) Date of Patent: Dec. 29, 2020

(54) RADICAL-ION BATTERY AND OPERATION THEREOF

(71) Applicant: National Technology & Engineering Solutions of Sandia, LLC, Albuquerque, NM (US)

(72) Inventor: Jeffrey P. Koplow, San Ramon, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 207 days.

(21) Appl. No.: 16/098,432

(22) PCT Filed: Feb. 16, 2017

(86) PCT No.: PCT/US2017/018209
§ 371 (c)(1),
(2) Date: Nov. 1, 2018

(87) PCT Pub. No.: WO2017/143088
PCT Pub. Date: Aug. 24, 2017

(65) Prior Publication Data
US 2019/0088971 A1  Mar. 21, 2019

Related U.S. Application Data

(60) Provisional application No. 62/297,022, filed on Feb. 18, 2016.

(51) Int. Cl.
*H01M 8/14* (2006.01)
*H01M 10/39* (2006.01)
(Continued)

(52) U.S. Cl.
CPC ......... *H01M 8/143* (2013.01); *H01M 2/1646* (2013.01); *H01M 2/40* (2013.01);
(Continued)

(58) Field of Classification Search
None
See application file for complete search history.

(56) References Cited

U.S. PATENT DOCUMENTS 4,945,012 A  7/1990  Bugga et al.
5,283,135 A  2/1994  Redey et al.
(Continued)

FOREIGN PATENT DOCUMENTS

CA  1193653 A  9/1985
GB  2121597  12/1983
WO  2016102373  6/2016

OTHER PUBLICATIONS

"International Search Report for PCT Patent Application No. PCT/US17/18209", dated Apr. 25, 2017, 2 pages.
(Continued)

*Primary Examiner* — Wojciech Haske
(74) *Attorney, Agent, or Firm* — Medley, Behrens & Lewis, LLC

(57) ABSTRACT

A electrochemical storage device, referred to herein as a radical-ion battery, is described. The radical-ion battery includes an electrolyte, first free radicals, and second free radicals, wherein the first free radicals and the second free radicals are different chemical species. The radical-ion battery also includes a separator that allows select ions to pass therethrough, but separates the electrolyte from the second free radicals.

14 Claims, 12 Drawing Sheets

(51) Int. Cl.
*H01M 2/16* (2006.01)
*H01M 10/42* (2006.01)
*H01M 8/18* (2006.01)
*H01M 2/40* (2006.01)
*H01M 10/38* (2006.01)
*H01M 8/04089* (2016.01)
*H01M 8/0202* (2016.01)
*H01M 8/04186* (2016.01)
*H01M 8/04082* (2016.01)

(52) U.S. Cl.
CPC ..... *H01M 8/0202* (2013.01); *H01M 8/04089* (2013.01); *H01M 8/04186* (2013.01); *H01M 8/04201* (2013.01); *H01M 8/144* (2013.01); *H01M 8/184* (2013.01); *H01M 8/188* (2013.01); *H01M 10/38* (2013.01); *H01M 10/399* (2013.01); *H01M 10/4214* (2013.01); *H01M 2220/10* (2013.01); *H01M 2250/10* (2013.01); *H01M 2300/002* (2013.01); *H01M 2300/0048* (2013.01)

(56) References Cited

U.S. PATENT DOCUMENTS

| | | |
|---|---|---|
| 2012/0139496 A1 | 6/2012 | Krishnan et al. |
| 2013/0115532 A1 | 5/2013 | Friesen et al. |
| 2014/0168854 A1* | 6/2014 | Kim ................. H01G 11/68 361/502 |
| 2014/0302370 A1 | 10/2014 | Woodford |

OTHER PUBLICATIONS

"Written Opinion for PCT Patent Application No. PCT/US17/18209", dated Apr. 25, 2017, 4 pages.

"International Preliminary Report on Patentability for PCT Patent Application No. PCT/US17/18209", dated Aug. 21, 2018, 5 pages.

* cited by examiner

RADICAL-ION BATTERY AND OPERATION THEREOF

RELATED APPLICATION

This application claims priority to U.S. Provisional Patent Application No. 62/297,022, filed on Feb. 18, 2016, and entitled "Novel Battery for Large-scale, Low-cost, Electrochemical Storage of Energy", the entirety of which is incorporated herein by reference.

BACKGROUND

Global energy consumption is projected to significantly increase by mid-century, and this increased need may be partially met through use of renewable energy sources. Due to the intermittent nature of some of these renewable energy sources, such as wind and solar, it is desirable to incorporate compatible large-scale energy storage devices into the energy grid. Use of such grid storage is also being driven by the evolving features of the electrical grid, such as green grid technology, smart grid technology, and a distributed structure of the grid, as well as by other technological developments, including electric vehicles.

Currently there are thousands of electrochemical devices, most of which are classified as batteries, flow batteries, or fuel cells. In a conventional battery, electrical current is generated by a thermodynamically favorable redox reaction that is carried out as two separate anode/cathode half-reactions. The chemical reagents for the redox reaction, as well as the two electrodes and an ion conducting electrolyte, are all contained within an enclosure of the battery. Many such batteries include additional components as well, such as separators to prevent inadvertent contact between the closely spaced anode and cathode surfaces.

Storage batteries may be rechargeable (e.g., a lithium ion battery) or non-rechargeable (e.g. a zinc metal-oxide cell). The energy storage capacity of such a device is limited by the quantity of electrochemically active reagents stored within the enclosed volume of the battery. In the case of a flow battery, the vast majority of the two electrochemically active reagents may be stored in external tanks rather than within the battery itself. The reactants are then fed into the electrode/electrolyte/electrode region of the battery on an as-needed basis. A well-known example of such a device is the vanadium redox flow battery, which has been investigated for the application of grid storage. A grid storage battery is a large-scale electrical storage device capable of sourcing/sinking substantial quantities of electrical power to/from the electrical grid. As indicated previously, grid storage is critically important for effective integration of intermittent renewable energy sources, such as solar and wind power.

Finally, a fuel cell is a device that operates on a similar principle to the flow battery, but one of the two chemical reagents is usually oxygen and the other is a chemical species typically classified as a fuel, such as hydrogen ($H_2$), methane ($CH_4$), methanol ($CH_3OH$), etc. In such a fuel cell, a combustion reaction that is normally carried out in a flame, such as $2H_2+O_2 \to 2H_2O$, is instead carried out in an electrochemical cell in the form of two physically separate half-reactions. For example, in an acid electrolyte fuel cell:
hydrogen electrode:

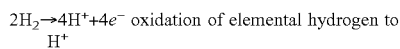
$2H_2 \to 4H^+ + 4e^-$ oxidation of elemental hydrogen to $H^+$ oxygen electrode:

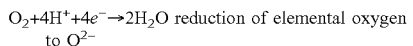
$O_2 + 4H^+ + 4e^- \to 2H_2O$ reduction of elemental oxygen to $O^{2-}$ In the above example, protons that are generated at the hydrogen electrode and consumed at the oxygen electrode are transported through the electrolyte in the interior of the fuel cell. The electrons generated at the hydrogen electrode and consumed at the oxygen electrode travel through an external circuit, such as the filament of an incandescent lightbulb. The net chemical reaction is the same as that which occurs within the hydrogen/oxygen flame, but in the case of a fuel cell, the free energy of the reaction $2H_2+O_2 \to 2H_2O$ is directly furnished in the form of electrical power rather than heat. When compared to using a hydrogen/oxygen flame to drive a heat engine (e.g., a gas turbine or internal combustion engine) to produce chemical work that is then used to impart rotation to an electrical generator, the fuel cell has, in principle, two major advantages. The first of these is the absence of moving parts, noise, etc. The second advantage is that heat engines are subject to the Carnot efficiency limit, whereas fuel cells are not. In other words, a fuel cell allows electrical power to be generated from chemical potential in a much more direct fashion then a heat engine and, in principle, it has the potential to carry out the chemical reaction in question as a thermodynamically reversible process in which none of the chemical potential is converted to waste heat.

A reason that fuel cells have currently failed to displace devices such as internal combustion engines in the vast majority of practical applications is that physical implementation of a device that carries out a combustion reaction, such as $2H_2+O_2 \to 2H_2O$, as a purely electrochemical process is fraught with numerous technical difficulties. In many instances, the technical obstacles that arise in the implementation of fuel cells, or analogs of such technical problems, also arise in batteries and flow batteries. Conventional electrical storage devices, then, are principally concerned with approaches to circumvent these technical difficulties.

In an example, in the case of a hydrogen/oxygen fuel cell, although the thermodynamics of the chemical reaction $2H_2+O_2 \to 2H_2O$ are favorable, the chemical kinetics of the two redox half-reactions occurring at the anode and cathode, are a significant limitation. This is especially the case with the $O_2$ half-reaction at the cathode, which has very high activation energy. A conventional approach to counteract such slow electrode kinetics is to coat the electrodes with catalytically active chemical species, such as platinum (so as to reduce the activation energy barrier), make the surface area of the electrode as large as possible, and apply an overvoltage to speed up the rate of the electrochemical reaction. Use of exotic materials, such as platinum, palladium, glassy carbon, etc., however, is cost-prohibitive in many cases. Further, candidate materials must be electrically conductive (or somehow blended with electrically conductive materials). Moreover, while there are numerous techniques of increasing the effective surface area of the electrode (e.g., by roughening the surface, corrugating the surface, etc., subject to limitations associated with trapping of gas bubbles), there are nearly always practical limitations regarding the total amount of volumetric space available (e.g., in a cell phone battery or car battery). Finally, the additional overvoltage that must be applied to force the electrochemical reaction to occur at a reasonably fast rate amounts to a source of thermodynamic irreversibility. Accordingly, in practice, experimentally, it may be observed that electrolysis of water (to produce hydrogen and oxygen) in such a fuel cell typically requires 1.8 to 2.0 V under standard state conditions, far in excess of the 1.23 V predicted on the basis of the free energy for the chemical reaction $2H_2+O_2 \rightarrow 2H_2O$ ($E^\circ=1.23$ V).

Looking at the electrode/reagent interaction at a microscopic scale, yet another problem that adversely affects the kinetics of a device, such as a hydrogen fuel cell, is that the reactions in question occur at a triple-phase boundary between the electrode, electrolyte, and a gas phase reactant ($H_2$ or $O_2$). In other words, the electrochemical reaction only occurs in the immediate vicinity of where a gas bubble forms a three-way intersection with the electrode and electrolyte. This means that at any given instant in time, the vast majority of the electrode surface is not actually participating in the electrochemical reaction. If, on the other hand, only a two-phase boundary is required, all regions of the electrode surface may be simultaneously active, which would greatly improve the kinetics of the half-reaction occurring at the electrode and drastically reduce the amount of overvoltage required to achieve a given operating current (or, alternatively, drastically increase the power density of such a device).

Yet another obstacle to favorable electrode kinetics concerns the nature of the transition state reaction complex for each half-reaction. For example, in the case of a hydrogen fuel cell, various complexities arise, such as, but not limited to: 1) whether formation of the transition state reaction complex involves breaking a strong covalent bond, such as that found in $O_2$; 2) whether formation of the transition state reaction complex involves making and breaking multiple chemical bonds or just one; 3) for a reaction, such as $2H_2+4 OH^- \rightarrow 4H_2O+4e^-$, such as that found in an alkaline electrolyte hydrogen fuel cell, how many molecules/ions must be brought together to form the transition state reaction complex, as well as the required precision of the geometry of the reaction complex; and 4) for a reaction, such as $O_2+4H^++4 e^- \rightarrow 2H_2O$ (such as that found in an acid electrolyte hydrogen fuel cell), the number of steps that are involved in the oxidation reduction reaction mechanism, and which steps are potentially rate limiting.

There have been various fuel cell architectures developed to date. The primary distinction between these different fuel cell architectures is the type of electrolyte employed. Each type of fuel cell is typically referred to by its acronym: AFC (alkaline fuel cell), PEMFC (proton exchange membrane fuel cell), DMFC (direct methanol fuel cell), PAFC (phosphoric acid fuel cell), MCFC (molten carbonate fuel cell), and SOFC (solid oxide fuel cell). In each architecture, the job of the electrolyte is to transmit a specific ion species that is generated by one of the electrode half-reactions and consumed by the other. The electrolyte must transmit such ions under the influence of electric field with as little electrical resistance as possible, but at the same time not transmit electrons. The choice of electrolyte has a direct bearing on: 1) what type of oxidation-reduction reactions may be contemplated for such a fuel cell; 2) what type of electrode materials may be used in such a fuel cell; and 3) the operating temperature range of such a fuel cell. These three factors in turn influence whether or not some form of catalyst is required at either or both electrodes to ensure adequately fast electrochemical kinetics and adequately small overvoltage. One broad theme that emerges in fuel cell technology is that high temperature operation is typically conducive to fast chemical kinetics (which may eliminate the need for expensive catalysts, such as platinum) and high electrolyte conductivity. On the other hand, operation at high temperature (e.g., 550° C. to 650° C. in the case of the molten carbonate fuel cell, and 800° C. to 1000° C. in the case of the solid oxide fuel cell) imposes numerous technical difficulties with materials compatibility, corrosion, seals, etc., and also places a practical lower limit on the size of a fuel cell. Small fuel cells have high surface area to volume ratios, such that the efficiency penalty associated with thermal losses for operation at high temperatures may be prohibitive.

Finally, some of the fuel cell architectures referenced above are vulnerable to poisoning by chemical impurities, such as sulfur and/or products of side reactions, such as carbon monoxide. Additional challenges include reactant/product mass transport rate limitations and the prevention of "crossover" of fuel and oxidant through the electrolyte, which results in "chemical short-circuiting" of the electrochemical cell. Each of the above concerns and trade-offs are germane to the discussion that follows.

Yet another fundamental difficulty that is encountered in electrochemical devices concerns non-ideal processes that adversely affect longevity. Consider, for example, the familiar lead acid batteries used in the automotive industry. The lead acid battery is based on disproportionation of lead (II) sulfate into lead (IV) oxide and elemental lead in a sulfuric acid electrolyte:

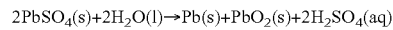
$2PbSO_4(s)+2H_2O(l) \rightarrow Pb(s)+PbO_2(s)+2H_2SO_4(aq)$

During discharge of the lead acid battery, the half reaction occurring at the (−) electrode is:

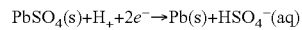
$PbSO_4(s)+H_++2e^- \rightarrow Pb(s)+HSO_4^-(aq)$ and the half-reaction occurring at the (+) electrode is:

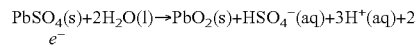
$PbSO_4(s)+2H_2O(l) \rightarrow PbO_2(s)+HSO_4^-(aq)+3H^+(aq)+2e^-$

The concentration of $H_2SO_4$ used in lead acid batteries, commonly referred to as "battery acid", is approximately 30%. The electrical conductivity of the aqueous $H_2SO_4$ electrolyte peaks at a sulfuric acid concentration of approximately 30%. Electrolyte conductivity is of paramount importance in most batteries, because resistive losses in the battery amount to another source of thermodynamic irreversibility. The series electrical resistance of the electrolyte can also be a limiting factor that determines the power density of the battery, because it dictates how much current can be drawn from the battery before the onset of excessive voltage droop. For the same reason, the electrical resistance of the electrolyte may also impose limitations on how quickly such a battery can be recharged. Some batteries, therefore, use electrolyte additives to reduce internal electrical resistance, but the addition of any chemical additive opens up new possibilities for chemical side reactions, materials incompatibility, etc.

Despite the extreme maturity of lead acid battery technology, lead acid batteries suffer from a number of non-idealities that are also representative of nuisance problems encountered with other battery chemistries. One such problem is sulfonation, the tendency of finely divided amorphous lead sulfate to crystallize into large electrochemically inert crystals. This process gradually reduces the energy capacity of a lead acid battery. Another problem, especially in stationary power applications, is electrolyte stratification. As noted above, it is desirable to maintain the concentration of sulfuric acid at approximately 30% to minimize electrolyte resistance; but $H_2SO_4$ has a much higher density than $H_2O$ and tends to "settle out of solution", thereby creating a concentration gradient in the electrolyte, wherein the $H_2SO_4$ solution, in the upper portion of the battery, is too weak, and the $H_2SO_4$ solution, in the lower portion of the battery, is too strong.

Many battery chemistries also suffer from structural deterioration over time, because one or more of the solid components within the batteries undergo volumetric changes during charging/discharging. Cyclic mechanical stress of such components can be very problematic if the materials in question are brittle. For example, in devices, such as lithium ion batteries, that rely on intercalation of Li+ ions in rigid material (such as graphite), electrochemical swelling caused by intercalation of lithium-ions can be problematic.

Gradual loss of battery capacity also commonly results from deposition of electrochemically inert material onto the surfaces of one or both electrodes. The chemical complexity of lithium-ion batteries, many of which, for example, contain upwards of five electrolyte additives, manifests itself in the form of other degradation processes observed over the life of the battery as well. These commonly include: 1) chemical reduction of the electrolyte (which is typically an alkyl carbonate) by the anode; 2) chemical oxidation of the electrolyte by the cathode; 3) thermal decomposition reactions of the electrolyte and/or electrolyte additives; 4) internal short circuits (e.g., due to dendritic growth); and 5) irreversible plating of lithium metal during rapid recharging or charging at low temperatures.

Still further, many high-performance battery chemistries suffer from intrinsic safety problems (as recently evidenced by the recall of SAMSUNG GALAXY NOTE 7 telephones). In the case of Li-ion batteries, for example, overcharging can eventually result in venting of the battery enclosure, often accompanied by discharge of flame. Discharging a Li-ion battery too deeply can also result in serious problems. Copper from the anode collector can migrate into the electrolyte, where it forms dendrites resulting in internal short circuits. This presents the risk of fire if someone subsequently attempts to recharge such a battery.

While the above discussion draws on representative examples of battery pathologies observed in familiar lead acid and Li-ion batteries, it is by no means exhaustive. Not surprisingly, many analogous degradation processes and failure modes are associated with other battery chemistries. An observation is that the potential for undesired/unintended chemical reactions increases rapidly as the number of chemical ingredients is increased. For instance, the problem of two chemical species that turn out to be chemically incompatible with each other can be considered. If three chemical reagents are present, there are three possible permutations for pairwise chemical incompatibility. The addition of a fourth reagent increases the number of pairwise permutations to six. Five chemical reagents yields ten pairwise permutations, and n reagents yields $n!/[2(n-2)!]$ potential pairwise incompatibilities. Therefore, as the number of chemical ingredients in a battery chemistry increases, likelihood of an unintended consequence increases rapidly.

SUMMARY

The following is a brief summary of subject matter that is described in greater detail herein. This summary is not intended to be limiting as to the scope of the claims.

Described herein are various technologies pertaining to a device that will hereafter be referred to as a radical-ion battery. A radical-ion battery is an electrochemical energy storage device that entails interconversion of ions residing in an electrolyte to and from chemically reactive species comprising a single unpaired electron; such chemical species are conventionally referred to as "free radicals." In the description that follows, we will use the terms "cationic electrode" and "anionic electrode" to unambiguously identify which electrode is being referred to; the cationic (anionic) electrode is the electrode at which redox half reactions involving cations (anions) occur.

In an exemplary embodiment, a radical-ion battery comprises an electrochemical cell that comprises a chamber that retains an electrolyte, such as sodium nitrite, although it is to be understood that any electrolyte that, through chemical reaction, can be split into free radicals (such as elemental sodium and nitrogen dioxide) are contemplated. The electrochemical cell further includes an anionic electrode, which can comprise a conductive material (such as stainless steel). Additionally, the anionic electrode can comprise a sparger, such that free radicals in gaseous form may be in contact with a relatively large amount of surface area of the sparger (which is formed of an electrically conductive material, such sintered stainless steel particles). As will be described in greater detail herein, when the radical-ion battery is charged, anions in the electrolyte are converted to free radicals at the anionic electrode. For example, conversion of nitrite ions ($NO_2^-$) from the electrolyte into nitrogen dioxide gas ($NO_2$) at the anionic electrode results in formation of free radicals in gaseous form, where these gaseous free radicals can be extracted from the electrochemical cell, and stored until there is need to discharge the battery. Conversely, when the radical-ion battery is discharged, free radicals in gaseous form, for example, can be brought into contact with the anionic electrode and the electrolyte and converted back to electrolyte ions (e.g. the electrochemical half reaction $NO_2 + e^- \rightarrow NO_2^-$). For instance, gaseous $NO_2$ can be introduced to the electrolyte via the sparger, where small bubbles form on the sparger, thereby producing a relatively large surface area over which the free radicals interface with the electrolyte and the sparger. When a load is placed across the terminals of the radical-ion battery, a free radical species such as $NO_2$ may be converted at the anionic electrode to a nitrite ion ($NO_2^-$) that then becomes part of the electrolyte.

The electrochemical cell of the radical-ion battery further includes a cationic electrode, wherein the cationic electrode can comprise a conductive metal in contact with free radicals (e.g., sodium metal, where the free radicals are in molten form). The electrochemical cell can further include a separator positioned between the electrolyte and the cationic electrode, wherein the separator allows for selected ions (e.g. Na+) to pass therethrough, but prevents other chemical species (e.g. molten sodium metal) from mixing with the electrolyte. When the radical-ion battery is charged, cations travel through the separator under the influence of an electric field, and subsequently combine with electrons to form an electrically neutral free radical species. For example, during charging, Na+ ions may travel through a sodium-beta-alumina separator under the under the influence of an electrical field, and combine with electrons at the cationic electrode to form sodium metal (Na); Na atoms have a single unpaired electron and are therefore free radicals. When the radical-ion battery is discharged, the free radical species present at the cationic electrode are split into electrons and cations, after which the cations travel through the separator under the influence of an electric field to the electrolyte compartment, while the electrons generated enter the cationic electrode (which is electrically connected to the anionic electrode through one or more external circuits). For example, during discharge of a sodium-based radical ion battery, sodium metal is split into a sodium ions and electrons at the cationic electrode.

The radical-ion battery has numerous advantages over conventional electrochemical storage systems. First, as free radicals are employed in the radical-ion battery and as free radicals are highly reactive, a relatively small amount of energy is needed to initiate reaction. Further, the radical-ion battery can store a relatively large amount of energy, thereby making the radical-ion battery particularly well-suited for grid storage applications. Moreover, materials utilized in the radical-ion battery tend to be abundant, and thus, inexpensive. Additionally, the reactions described herein with respect to the radical-ion battery are hypothesized to be substantially free of unwanted side reactions and do not require expensive catalysts to perform the chemical reactions associated with energy creation and storage. Still further, it is hypothesized that the radical-ion battery described herein can be charged and discharged several thousand times without substantial degradation of performance (e.g. capacity fade), thereby offering an improvement over many conventional rechargeable batteries.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
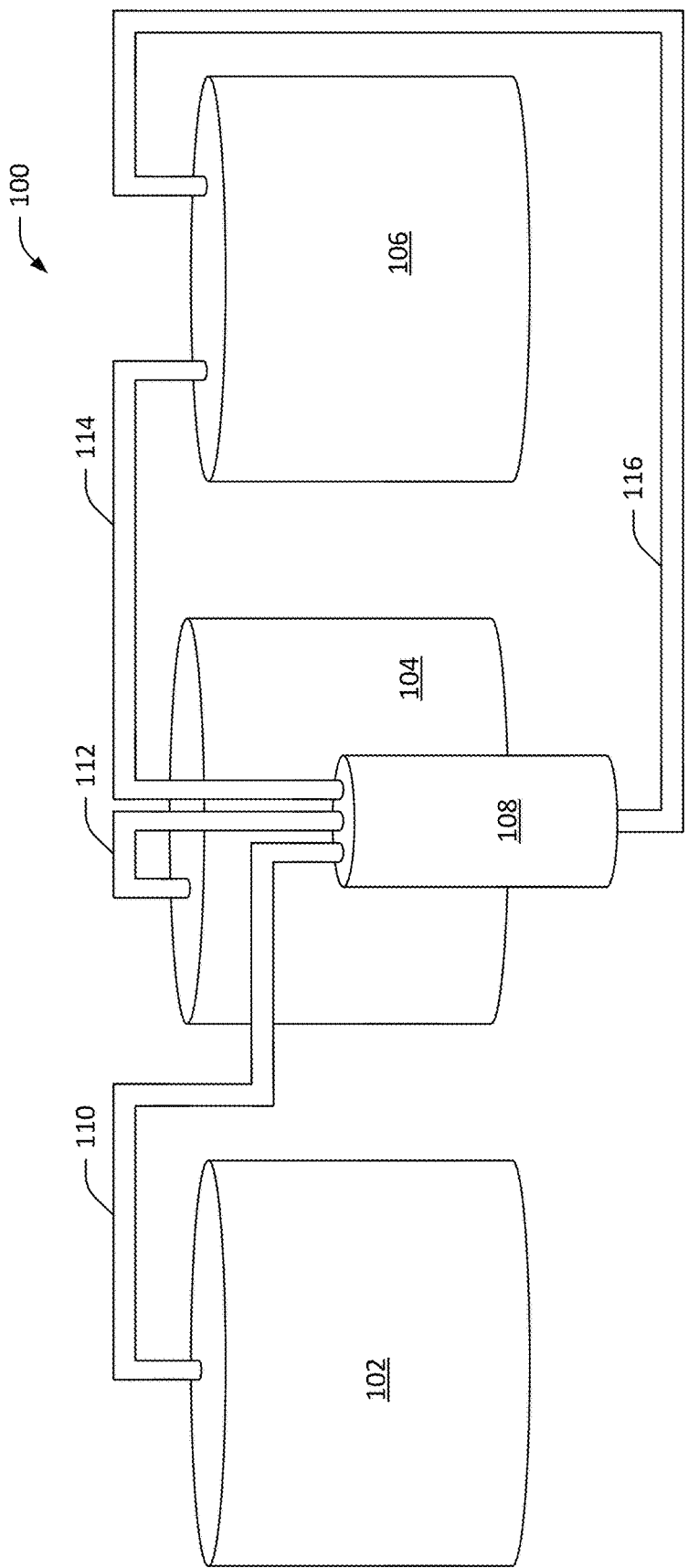
FIG. 1 illustrates an exemplary embodiment of a radical-ion battery.

Various technologies pertaining to an electrochemical energy storage device, referred to herein as a radical-ion battery, are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The radical-ion battery described herein is designed to provide high energy storage density at very low cost and very high charging/discharging round-trip efficiency. The chemistry of the electrochemical cell of the radical-ion battery is designed to provide very facile chemical kinetics at both the anode and cathode surfaces, extremely high electrolyte conductivity, and is further configured to minimize problems, such as unwanted side reactions, internal degradation processes, and capacity fade. Exemplary chemical reagents included in the radical-ion battery are derived from earth-abundant elements, which enables the radical-ion battery to be scaled to high production volumes. The radical-ion battery may be employed in a variety of settings, such as grid storage, vehicle electrification, amongst others.

With reference now to FIG. 1, a schematic of an exemplary electrochemical radical-ion battery 100 is illustrated. The radical-ion battery 100 includes three storage containers 102, 104, and 106 respectively. The first storage container 102 can retain, for example, first free radicals (chemically reactive atoms and/or molecules having a single unpaired electron) in liquid form. For instance, the first storage container 102 may retain sodium in liquid (molten) form. Accordingly, the first container 102 can be heated to a temperature that causes the free radicals retained in the first container 102 to be maintained in liquid form. The second container 104 can retain an electrolyte in liquid (molten) form. For instance, the electrolyte may be sodium nitrite; thus, the second container 104, similar to the first container 102, can be heated such that the electrolyte retained therein is maintained in molten form. The third container 106 can include second free radicals in liquid form. In a non-limiting example, the second free radicals can be nitrogen dioxide. Therefore, rather than the third storage container 106 being heated, the third storage container 106 can be cooled such that the free radicals in the third storage container 106 are in liquid form. Further, in such an embodiment, as the second free radicals need not be stored in gaseous form, the third storage container 106 need not be pressurized.

The radical-ion battery 100 further includes an electrochemical cell 108 that is in fluid communication with the storage containers 102-106. More specifically, a first fluid conduit 110 fluidically couples the first storage container 102 with the electrochemical cell 108, such that the first free radicals retained in the first storage unit 102 can be delivered to the electrochemical cell 108 by way of the first conduit 110 and extracted from the electrochemical cell 108 by way of the first conduit 110. A second fluid conduit 112 fluidically couples the second storage container 104 with the electrochemical cell 108, such that the electrolyte can be extracted from the second storage container 104 and delivered to the electrochemical cell 108 by way of the second fluid conduit 112, and the electrolyte can be extracted from the electrochemical cell 108 and delivered to the second storage container 104 by way of the second fluid conduit 112. A third fluid conduit 114 fluidically couples the third storage container 106 with the electrochemical cell 108, wherein the third fluid conduit 114 acts as a gas exit conduit for the electrochemical cell 108. Thus, second free radicals (e.g., in gaseous form) can exit the electrochemical cell 108 by way of the third fluid conduit 114 and enter the third storage container 106, where the second free radicals can condense and be stored in the third storage container 106 in liquid form. A fourth fluid conduit 116 also fluidically couples the third storage container with the electrochemical cell 108, and can be employed in connection with delivering second free radicals from the third storage container 106 to the electrochemical cell 108. The second free radicals, when entering the electrochemical cell 108, can be in gaseous form. While the first storage container 102, the second storage container 104, and the third storage container 106, respectively, have been described as retaining sodium, sodium nitrite, and nitrogen dioxide, various other chemistries are contemplated and are described below. For purposes of explanation going forward, however, the discussion will be set forth as the storage units 102-106 retaining sodium, sodium nitrite, and nitrogen dioxide.

It will further be understood that the above description represents one of many possible configurations by which storage containers 102, 104, and 106 may be connected to deliver/withdraw chemical reagents to/from electrochemical cell 108 in a manner consistent with device operation. Any combination of subsystems adapted to maintain predetermined levels, quantities, or concentrations of active reagents (e.g. Na, $NaNO_2$, and $NO_2$) within electrochemical cell 108 may be contemplated.

Figure 2:
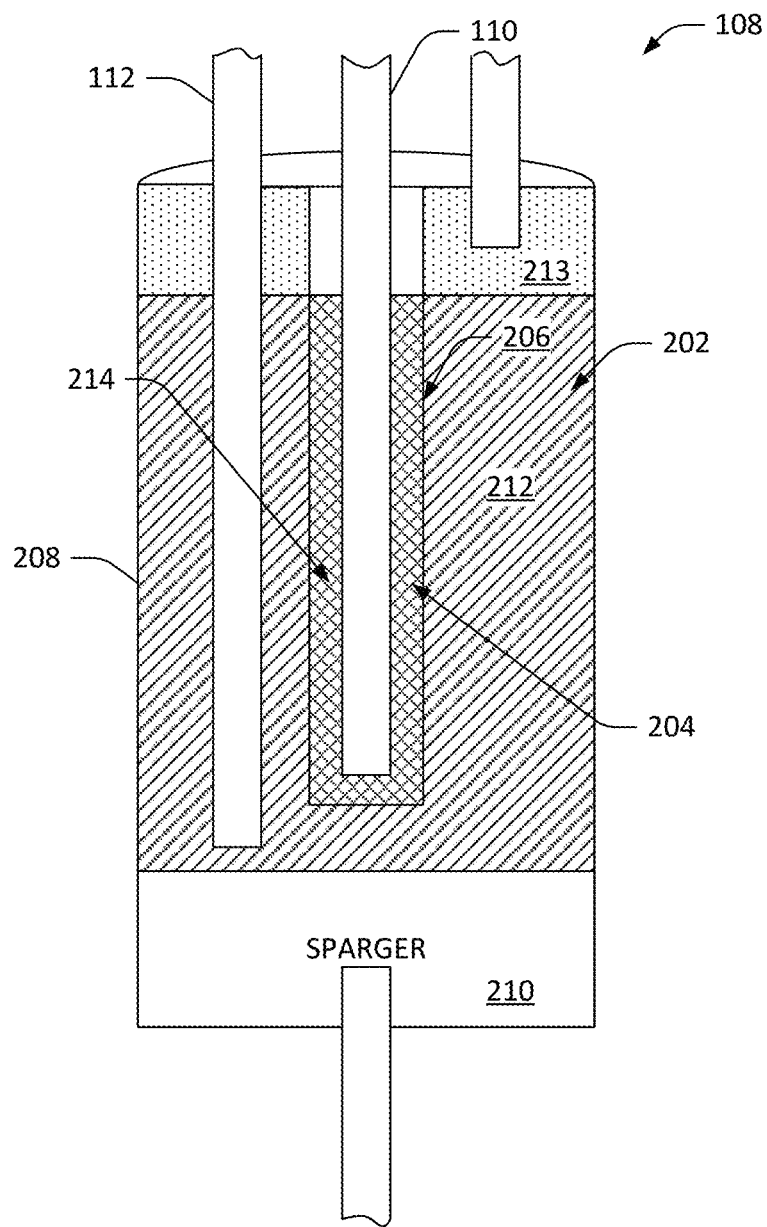
FIG. 2 is a cross-sectional diagram of an exemplary electrochemical cell of a radical-ion battery.

With reference now to FIG. 2, a cross-sectional view of the electrochemical cell 108 is illustrated. The electrochemical cell 108 comprises a chamber 202 that is configured to retain electrolyte. As described previously, electrolyte can be delivered to the chamber 202 from the second storage container 104 and extracted from the chamber 202 for retention in the second storage container 104 by way of the second fluid conduit 112. The electrochemical cell 202 also comprises a second chamber 204 that is configured to retain first free radicals (e.g., in molten form), which are delivered to the second chamber 204 from the first storage container 102 by way of the first fluid conduit 110 and can be extracted from the second chamber 204 and delivered to the first storage unit 102 by way of the first fluid conduit 110. In the exemplary embodiment pictured in FIG. 2, a separator 206 defines the boundaries of the second chamber 204, and prevents the first free radicals in the second chamber 204 from reacting with the electrolyte in the chamber 202. The separator 206, however, allows selected ions to pass therethrough. For instance, when the electrolyte in the radical ion battery 200 is $NaNO_2$, the separator 206 can prevent $NO_2$ ions from coming into contact with sodium metal, while allowing $Na^+$ ion to pass through the separator 206. Accordingly, selected ions (in the electrolyte) in the chamber 202 can pass through the separator 206 and into the second chamber 204, and similarly selected ions in the second chamber 204 can pass through the separator 206 into the chamber 202. For instance, the separator 206 can be fabricated from a sodium-ion-selective membrane material, such as sodium-beta-alumina. In an exemplary embodiment, the separator 206 and the second chamber 204 can be a single module that serves as both a separator and a wall of the second chamber 204 (e.g., a closed-ended ceramic tube fabricated from Na-$\beta$-$Al_2O_3$). In another exemplary embodiment, a composite structure can be used (e.g., Na-$\beta$-$Al_2O_3$ bonded to porous sintered stainless steel to provide structure support and/or enable a thinner layer of Na-$\beta$-$Al_2O_3$ to be used).

The separator 206 may also take the form a composite structure comprising one or more underlying reinforcements, such as screen, mesh, fibers, and/or perforated sheet, embedded or partially embedded in a vitreous enamel. In some embodiments said underlying reinforcement may comprise steel screen, mesh, sintered metal, perforated plate, or a combination of any two or more of the foregoing. The vitreous enamel may comprise a material whose majority component is $SiO_2$, but further comprises any combination of glass forming constituents $B_2O_3$, $Al_2O_3$, $P_2O_5$, $GeO_2$ and $TiO_2$, alkali metal oxides, $Li_2O$, $Na_2O$, and $K_2O$, alkaline earth oxides, MgO, CaO, SrO, and BaO, adhesion promoters that include oxides of Co, Fe, Ni, Cu, Mn, fluorides such as LiF, NaF, KF, $MgF_2$, $CaF_2$, $SrF_2$, and $ZrF_4$. Said vitreous enamel is adapted to hermetic coating of and adhesion to said underlying reinforcement, chemical compatibility with other chemical constituents in the cell (e.g. Na, $Na^+$, $NO_2^-$, $NO_2$), ionic conduction of one or more species, such as $Na^+$, and compatibility with the thermal expansion characteristics of said underlying reinforcement material.

The electrochemical cell 108 can include an electrically conductive housing 208 that defines boundaries of the chamber 202. In an example, the electrically conductive housing 208 may be formed from stainless steel or other suitable electrically conductive metal. The electrochemical cell 108 further comprises a sparger 210, which can be formed of an electrically conductive material. While the sparger 210 is illustrated as being at a "bottom" of the electrochemical cell 108, the sparger 210 can be placed anywhere on an interior wall of the electrochemical cell 108 that forms the boundary of the chamber 202, provided that the sparger is substantially submerged in electrolyte. As will be described in greater detail herein, the sparger 210 is configured to facilitate interaction between the second free radicals, electrolyte in the chamber 202, and the conductive housing 208, wherein the interaction is facilitated by causing small bubbles of the second free radicals to be located on a surface of the sparger 210 and come into contact with electrolyte held in the chamber 202.

When the radical-ion battery is being neither charged nor discharged, the chamber 202 includes a specified volume of electrolyte 212 therein, and also includes a specified volume of first free radicals 213 (in gaseous form) that, due to being less dense than the electrolyte 212, sits above the electrolyte 212 in the chamber 202. The second chamber 204 includes a specified volume of the second free radicals 214 therein, wherein the electrolyte 212 and the second free radicals 214 are separated by the separator 206.

Figure 3:
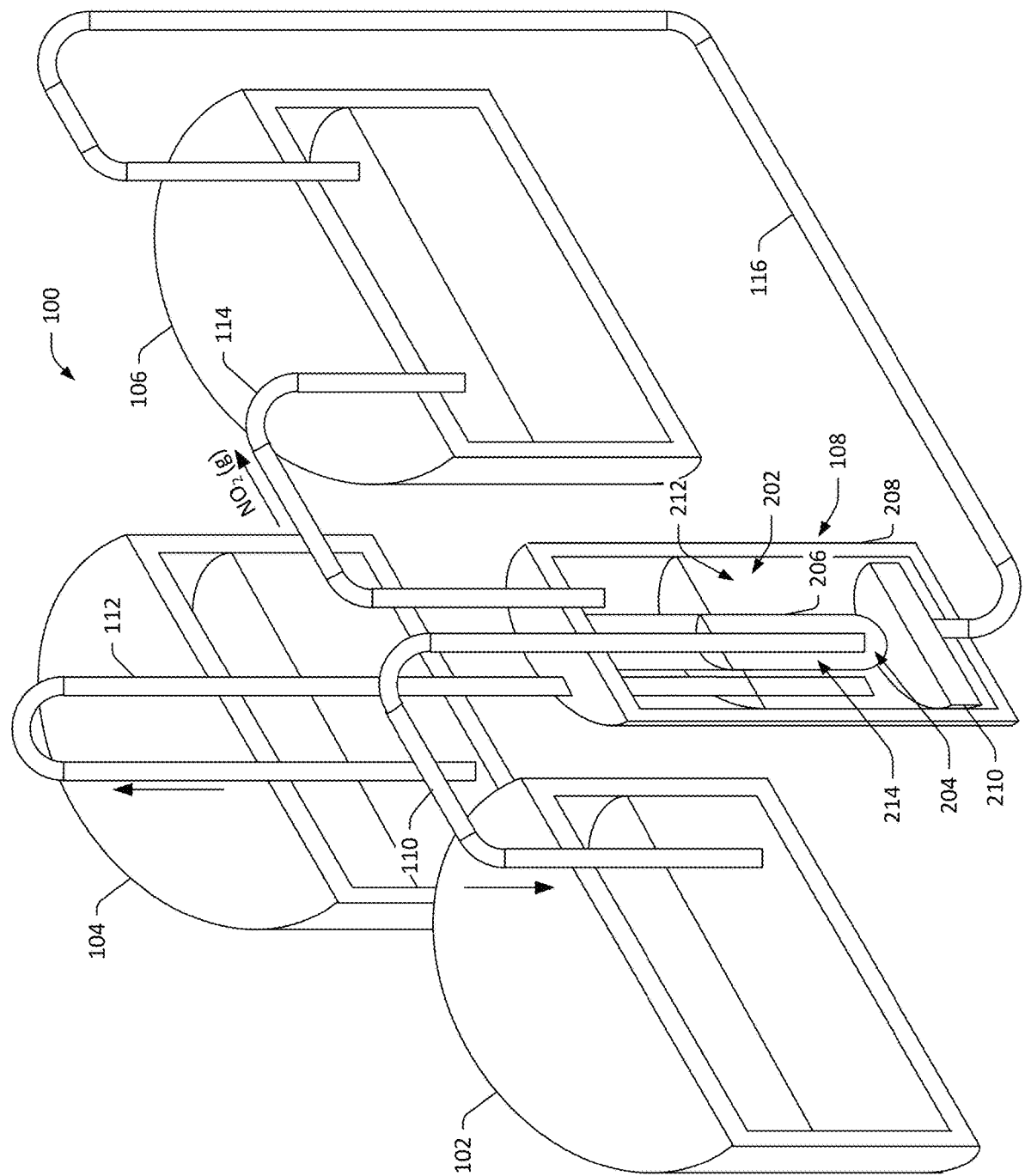
FIG. 3 is a schematic that depicts charging of a radical-ion battery.

With reference now to FIG. 3, operation of the radical ion battery 100 when charging is illustrated. To cause the discussion below to be more concrete, utility scale grid storage is used as a representative application for the radical-ion battery 100. Further, an exemplary embodiment is described herein, where the electrolyte 212 of the radical ion battery 100 is $NaNO_2$; this exemplary embodiment is set forth to describe an overview, and it will be understood that the description of this representative embodiment/application is in no way meant to be limiting. As will be discussed below, a very wide range of other embodiments and applications are contemplated.

The housing 208 can act both as an electrode and a containment vessel for the electrolyte 212, wherein the electrolyte 212 comprises molten $NaNO_2$ maintained at a temperature of approximately 300° C. (e.g. above the 271 C melting point of $NaNO_2$, but below the temperature at which $NaNO_2$ is subject to thermal decomposition), and further wherein the electrolyte 212 surrounds the second chamber 204 defined by the separator 206. The operating temperature is to be sufficiently high so as to ensure that the electrolyte 212 is molten; however, addition of freezing point depression additives and/or use of cations other than sodium may alter the lower bound of the temperature. Operating at lower temperatures can provide one or more benefits, such as the ability to use elastomeric seals. Operating at higher temperatures can also provide one or more benefits, such as faster chemical kinetics and higher electrolyte conductivity (the rate of thermal decomposition or other such irreversible side reactions, however, must be suitably low to provide an extremely long service lifetime—thereby imposing a practical upper limit on operating temperature). In a non-limiting example, in the case of pure $NaNO_2$, the temperature can be maintained within a range of 275° C. and 315° C.

The second chamber 204 includes the first free radicals 214, which can be in the form of molten Na metal. The first fluid conduit 110, together with the molten sodium metal 214, function as a second electrode. For sake of clarity, auxiliary subsystems such as pumps and valves utilized to deliver chemicals to the electrochemical cell 108 and extract chemicals from the electrochemical cell 108 are omitted herein.

As noted earlier, for sake of clarity, the following notation is introduced. The term cationic electrode refers to the electrode that sources or sinks cations during discharge and charge of the radical-ion battery 100, respectively, and the anionic electrode refers to the electrode that sources and sinks anions during discharge and charge, respectively, of the radical-ion battery 100. Accordingly, the cationic electrode can comprise the first fluid conduit 110 in combination with the molten Na 214 and the anionic electrode can comprise the housing 208 and the sparger 210.

When charging the radical ion battery 100, the (+) terminal of a DC power supply is connected to the anionic electrode, and the (–) terminal of the DC power supply is connected to the cationic electrode, thereby applying an electric field to the electrolyte 212. Thus, $Na^+$ ions in the electrolyte 212 are attracted to the negatively charged cationic electrode, while $NO_2^-$ ions are attracted to the positively charged anionic electrode. $NO_2^-$ ions arriving at the surface of the anionic electrode are split into $NO_2$ molecules (which are electrically neutral) and electrons. The electrons flow into the anionic electrode and travel to the (+) terminal of the DC power supply, while the $NO_2$ molecules form gas bubbles at the surface of the anionic electrode. Once the gas bubbles become large enough, buoyant forces cause them to detach from the surface of the anionic electrode, and float to the surface of the electrolyte 212 where the gas bubbles burst. The $NO_2$ gas released reaches the third storage container 106 by way of the third fluid conduit 114.

Meanwhile, under the influence of the electric field applied to the electrolyte 212, the $Na^+$ ions in the electrolyte 212 enter the (ion-permeable) separator 206. These ions emerge on the other side of the separator 206, where they immediately combine with electrons sourced by the negatively charged cationic electrode. It is again noted that the cationic electrode comprises both a solid metal electrode (e.g., a 304 SS rod) and the molten second free radicals 214 (liquid sodium metal) in which the solid metal electrode is immersed. It can thus be ascertained that the electrode/electrolyte interface, where $Na^+$ ions undergo the electrochemical reduction to Na atoms, is located where the molten sodium metal wets the surface of the separator 206. It is also repeated that the separator 206, in this embodiment, is configured to substantially prevent passage of ions other than $Na^+$ therethrough, is further configured to substantially prevent electrons from passing therethrough, and is still further configured to substantially prevent any neutral species from passing therethrough. The function of the separator 206 is to separate the highly reactive first free radicals 214 from anything that is reactive towards the second free radicals. For instance, when the electrolyte 212 is $NaNO_2$ and the first free radicals 214 is molten sodium, the separator 206 is configured to allow $Na^+$ ions from the electrolyte 212 to pass through, while separating the highly reactive sodium metal from anything that is reactive towards Na, such as the $NaNO_2$ electrolyte and the $NO_2$ gas. As more Na atoms are formed, Na is removed from the second chamber 204 and placed in the first storage container 102. Further, the electrolyte 212 is replenished from the second storage container 104, so that the electrochemical cell 108 retains desired (constant) volumes of $NO_2$, Na, and $NaNO_2$.

In summary, then, electrical power is supplied to carry out the following thermodynamically unfavorable electrolysis reaction:

$$NaNO_2 \rightarrow Na + NO_2,$$

with the following half-reactions:

$$Na^+ \text{ (molten)} + e^- \text{(cationic electrode)} \rightarrow Na \text{ (liquid)}$$

($Na^+$ ions are sinked from the electrolyte 212);

$$NO_2^- \text{(molten)} \rightarrow NO_2 \text{ (gas)} + e^- \text{ (anionic electrode)}$$

($NO_2^-$ ions are sinked from the electrolyte 212), and the separator 206 is employed to prevent other unwanted side reactions from occurring. The supplied electrical energy is stored in the form of Na and $NO_2$ reagents (in the storage containers 102 and 106, respectively), and the charged battery has about 3 volts of electrical potential between its two electrodes.

Figure 4:
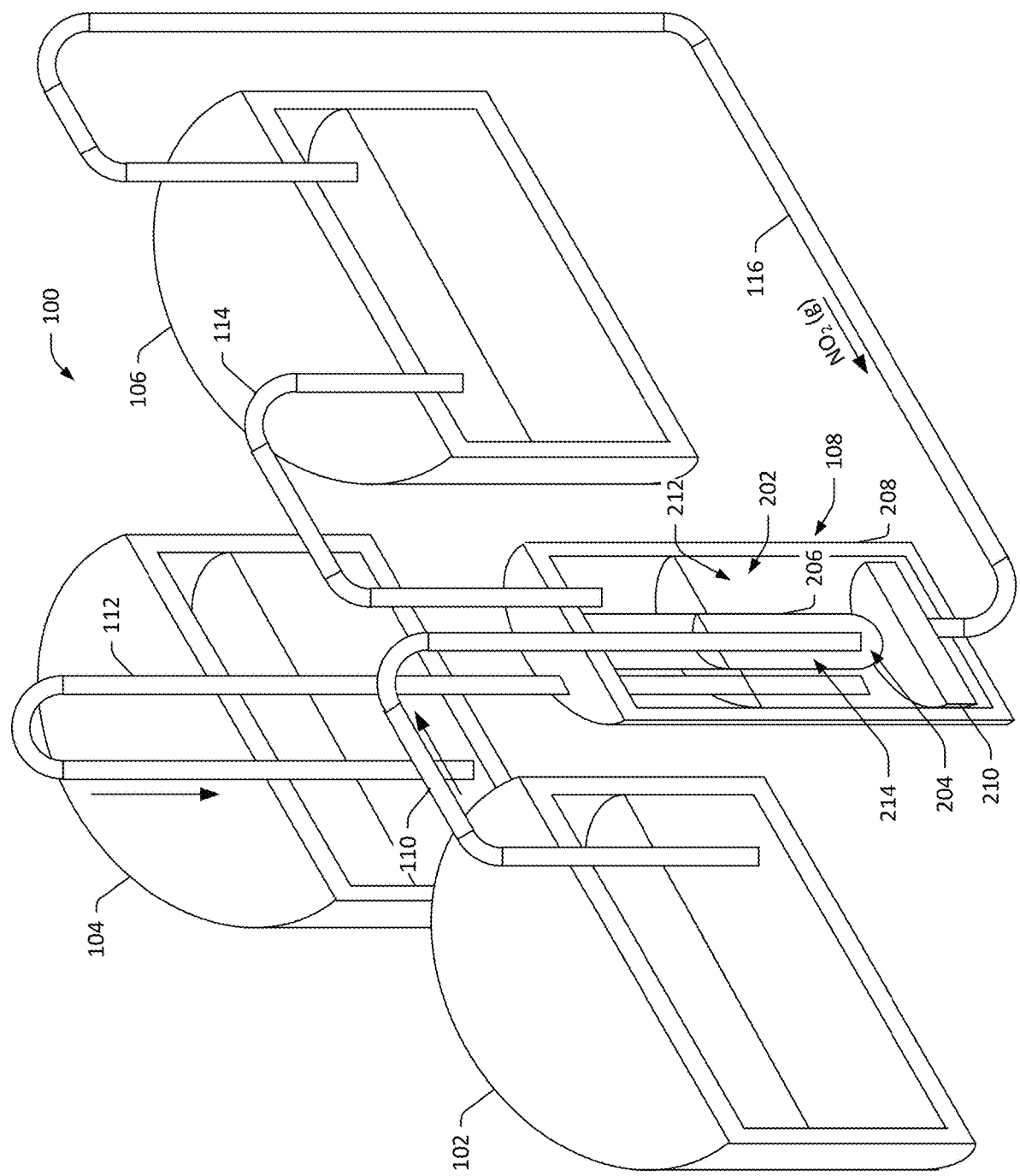
FIG. 4 is a schematic that depicts discharging of a radical-ion battery.

Referring now to FIG. 4, operation of the radical ion battery 100 when the radical ion battery is being discharged is set forth. When an electrical load is applied between the anionic and cationic electrodes. At the cationic electrode, highly reactive Na metal atoms separate into $Na^+$ ions and electrons, wherein the electrons flow into the cationic electrode, through the electrical load, and arrive at the anionic electrode. The $Na^+$ ions travel in the opposite direction, passing through the separator 206 under the influence of the electrical field provided by the radical ion battery 100, and arriving at the separator 206—electrolyte 212 interface. The $Na^+$ ions become part of the $NaNO_2$ electrolyte 212. As the sodium metal in the second chamber 204 is used, the sodium metal can be replenished from the second storage container 102.

Meanwhile, the electrons that made their way from the cationic electrode, through the electrical load, to the anionic electrode, react with $NO_2$ molecules at the electrode—electrolyte interface, producing $NO_2^-$ molecules, which enter the electrolyte 212 (thereby counterbalancing the flow of $Na^+$ ions entering the electrolyte at the opposite side of the electrochemical cell 108. The excess of cations on one side of the electrolyte 212 and anions on the other side of the electrolyte 212 causes a minute amount of counter-propagating motion of Na$^+$ and NO$_2^-$ ions in the electrolyte 212 to maintain the cell potential at ~3 volts (until the battery becomes fully discharged). The NO$_2$ molecules may be in the form of gas bubbles (placed at the electrode-electrolyte interface by the sparger 210), or may be dissolved in the electrolyte 212. As the NO$_2$ molecules are used, NO$_2$ can be replenished in the chamber 202 from the third storage container 106 (by way of the fourth fluid conduit 116). Electrolyte generated during the discharge process can be extracted from the chamber 202 and directed to the second storage container 104, such that the electrochemical cell 108 includes desired (constant) volumes of NaNO$_2$, Na, and NO$_2$ at all times.

In summary, then, during discharge of the radical ion battery 100, the following half-reactions are carried out:

Na (liquid)→Na$^+$ (molten)+$e^-$ (cationic electrode)

(Na$^+$ ions are sourced to the electrolyte 212);

NO$_2$ (gas)+$e^-$ (anionic electrode)→NO$_2^-$ (molten)

(NO$_2^-$ ions are sourced to the electrolyte 212).

Additional detail pertaining to chemical reactions occurring during charge and discharge of the radical ion battery 100 is now provided. Using tabulated thermodynamic data for the standard free energy of formation for each of the reagents:

$\Delta G_f^\circ(\mathrm{Na})=0$ kJ mol$^{-1}$;

$\Delta G_f^\circ(\mathrm{NO}_2)=+51.9$ kJ mol$^{-1}$;

$\Delta G_f^\circ(\mathrm{NaNO}_2)=-284.6$ kJ mol$^{-1}$.

The change in free energy for the Na+NO$_2$→NaNO$_2$ reaction under standard state conditions is as follows:

$\Delta G^\circ(\mathrm{Na})=-336.5$ kJ mol$^{-1}$, from which a standard state electro-chemical potential of the following can be calculated:

$$E^\circ = \frac{\Delta G_f^\circ}{nF} = \frac{336500 \text{ J mol}^{-1}}{96485 \text{ C mol}^{-1}} = 3.49 \text{ V}$$

Figure 5:
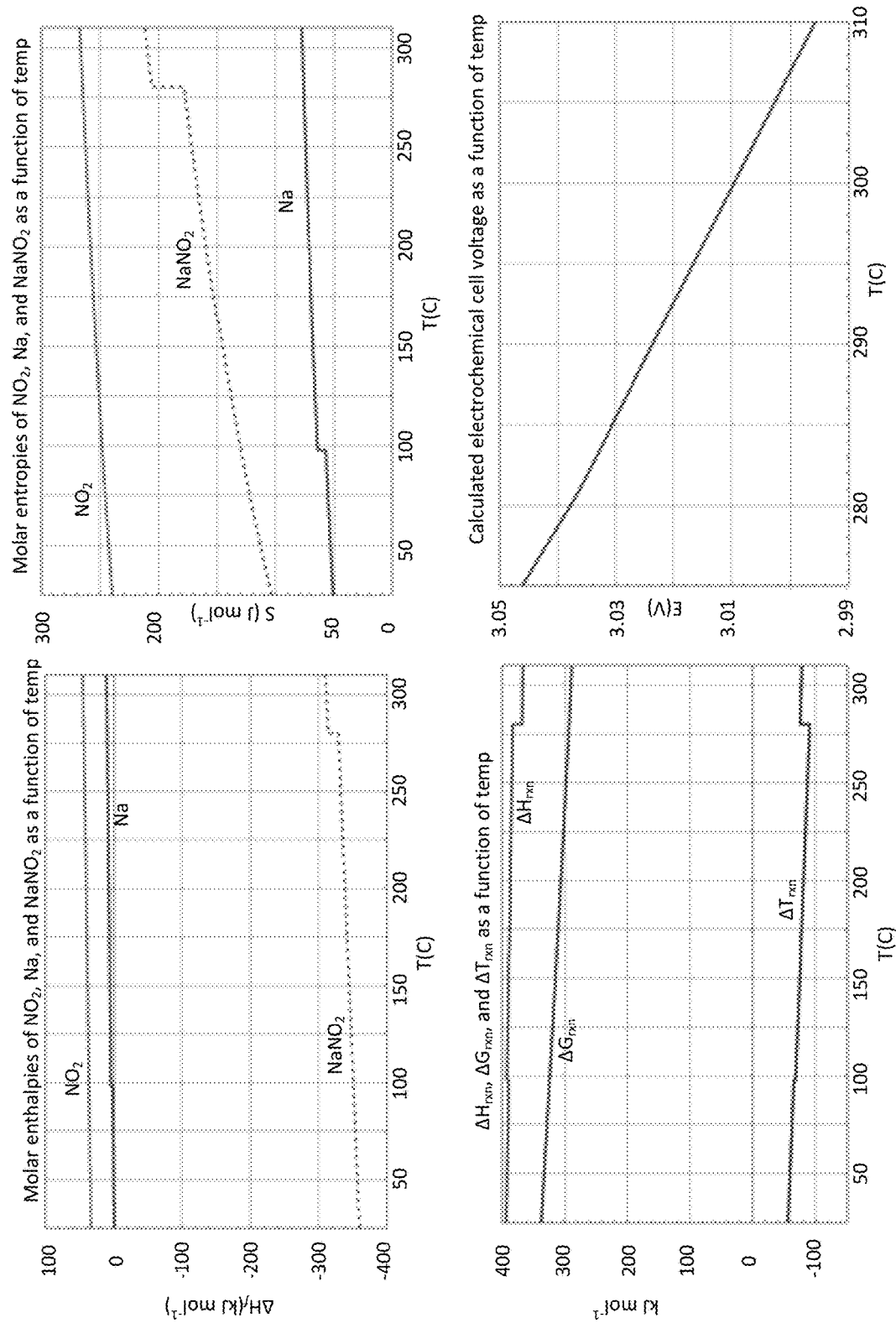
FIG. 5 depicts plots for molar enthalpies, molar entropies, $\Delta H$, $\Delta S$, and $\Delta G$ for the reaction $NaNO_2 \rightarrow Na+NO_2$, and the electrochemical cell voltage, all as a function of temperature.

At elevated temperature (e.g., above the 271 C melting point of NaNO$_2$), the free energy required to dissociate NaNO$_2$ into Na and NO$_2$ is somewhat lower. Based on heat capacity data for Na, NO$_2$, and NaNO$_2$, the molar enthalpies and molar entropies, $\Delta H$, $\Delta S$, and $\Delta G$ for the reaction NaNO$_2$→Na+NO$_2$ can be calculated, and the temperature dependence of the electrochemical cell voltage can also be calculated. Briefly, these calculations are depicted in FIG. 5. The step-like features in some of these plots correspond to solid-to-liquid phase transitions. The calculated cell voltage at the nominal operating temperature of 300° C., assuming an NO$_2$ partial pressure of 1 atmosphere, is 3.01 V with a temperature coefficient of −1.4 mV K$^{-1}$.

While FIGS. 3 and 4 illustrate that the anionic electrode includes the housing and the sparger 210, other arrangements are also contemplated. For instance, the electrochemical cell 108 may include two anionic electrodes: a first electrode that is adapted to efficient execution of the charging half reaction (e.g., NO$_2^-$→NO$_2$+$e^-$, and a second electrode that is adapted to efficient execution of the discharging half reaction (e.g., NO$_2$+$e^-$→NO$_2^-$). A switch can be employed to control which of the two electrodes is "active".

Further, the electrolyte 212 can be a mixed cation electrolyte. In such an embodiment, such that the mole fraction of the constituent cations remains constant, the electrochemical cell 108 may comprise a plurality of ion-selective cationic electrodes (one for each constituent cation in the electrolyte 212). For example, the electrolyte 212 can comprise a binary eutectic of 65/35 KNO$_2$/NaNO$_2$ (due to its relatively low melting point of 225 C and the relatively high cell voltage of KNO$_2$). By "activating" two ion-selective cationic electrodes in accordance with the desired mole fraction of 65/35, the mole fraction can be kept approximately constant. In other words, during charge or discharge, a cationic electrode that is selective to K ions can be active for 65% of a predefined time window, while a cationic electrode that is selective to Na ions can be active for 35% of the predefined time window.

Moreover, while the electrochemical cell 108 of the radical ion battery 100 has been depicted as performing both charge and discharge operations, it is to be understood that the electrochemical cell 108 can be optimized to perform only one of such operations. For instance, a split-system is contemplated, where the charging electrochemical reaction is carried out at a first geographic location, and the discharging electrochemical reaction is carried out at a section geographic location (which is some distance from the first geographic location). In an example, the charging reaction may occur in a relatively rural area, where energy is harvested by arrays of solar panels, resulting in creation of NO$_2$. The NO$_2$ can be transported to a city (e.g., by rail cars, as described below), where it can be used to provide electrical power to the city. Hence, an electrochemical cell used to carry out the charging reaction may be optimized for such reaction, while an electrochemical cell used to carry out the discharging reaction may be optimized for such reaction.

Figure 6:
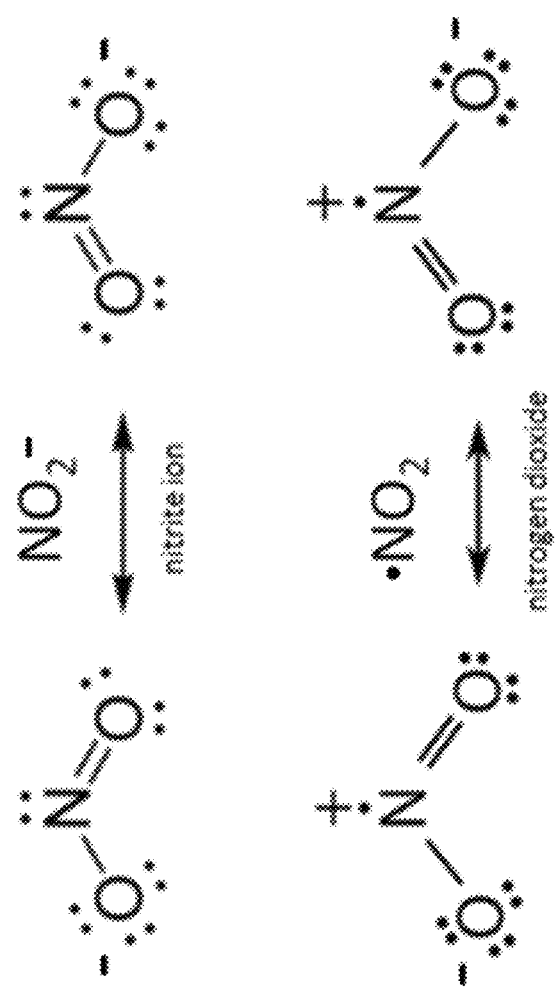
FIG. 6 depicts Lewis dot diagrams for the nitrite ion and nitrogen dioxide.

Referring to FIG. 6, it can be noted that both electrode processes comprise simple electron transfer reactions that involve no bond breaking or displacement of nuclei (other than a change of O—N—O bond angle to/from 115° for NO$_2$ and 134° for NaNO$_2$), and that both half-reactions involve an ion and a free radical. The unpaired electrons of free radical species such as Na and NO$_2$ tend to be chemically labile, and unlike neutral molecules such as Hz, O$_2$, H$_2$O, etc., ionic species such as Na$^+$ and NO$_2^-$ readily accept and donate electrons, respectively. The use of radical/ion electron transfer reactions at both electrodes is directed towards providing unusually favorable electrochemical reaction kinetics. The very low activation energy of radical/ion electron transfer reactions, in addition to the fact that each half-reaction presumably entails no breaking of covalent bonds, further suggests that exotic catalysts, such as platinum, palladium, etc., will not be necessary to achieve low over voltages and high current density. As mentioned earlier, eliminating the need for expensive/exotic catalyst materials is an important objective. As discussed later, a point that is often overlooked is that the presence of such potent catalysts increases the likelihood of undesired side reactions that prove detrimental to the longevity and reliability of a proposed electrochemical cell. It will further be understood that NO$_2$ adsorbed onto the surface of the electrode should be bound weakly enough avoid substantial inhibition of NO$_2$ release once the electron is transferred from NO$_2^-$ ion to the anionic cathode. Finally, to the extent that a radical-ion redox half-reaction, such as NO$_2^-$→NO$_2$+$e^-$, exhibits relative indifference to the material chosen for the electrode, it also implies that the constraints on the chemical purity of the electrode surfaces and reagents are likely to be relaxed.

The fact that the electrolyte 212 and electrochemically active species transported through the electrolyte 212 are one and the same is also favorable from the standpoint of reaction kinetics (due to concentration effects) and transport (due to the very short distance $Na^+$ and $NO_2^-$ ions are required to move within the electrolyte 212 to reestablish electrostatic equilibrium). Yet another important aspect of the electrochemical cell 108 concerns facile reactant/product transport. Because $NO_2$ is evolved as buoyant gas bubbles, $NO_2$ gas generated during the charging reaction is rapidly removed from the vicinity of the anionic electrode, rather than accumulating in the surrounding electrolyte 212. In the case of the cationic electrode, accumulation of Na in the electrolyte 212 adjacent to the cationic electrode is a nonissue, because Na and $Na^+$ are rigorously separated by the separator 206. In fact, presence of this separator 206 is the only reason that the reaction $NaNO_2 \rightarrow Na+NO_2$ can be carried out. If the separator 206 were absent, sodium metal would immediately react with the electrolyte to form oxides of sodium.

It can further be noted that a clear distinction can be made between half-reactions at the anionic electrode 208 involving stable free radical species, such as $NO_2$, and chemical species such as diatomic chlorine ($Cl_2$). While individual chlorine atoms have unpaired electrons by virtue of having an odd number of valence electrons, atomic chlorine is not a stable free radical that persists indefinitely under the conditions found in electrochemical cells, such as the electrochemical cell 108. Rather, atomic chlorine atoms rapidly combined to form diatomic chlorine, a stable covalently bonded molecule with a bond energy of 240 kJ $mol^{-1}$. The strong covalent bond found in $Cl_2$ (and other such halogen species) represents a significant kinetic impediment to the electrochemical half-reaction at the anionic electrode. In marked contrast, the electrochemical half-reaction involving the interconversion of $NO_2$ and $NO_2^-$ at the anionic electrode entails no bond breaking or displacement of nuclei and is hypothesized to have very low activation energy. Beyond the halogens, it will be understood that there are many chemical species that may be converted to free radicals under appropriate conditions, but that do not furnish significant steady state concentrations of free radicals under the conditions found in the electrochemical cell 108.

Still yet another important attribute of the radical-ion battery 100 is the extreme abundance of the constituents required to fabricate such battery 100. The net reaction for the synthesis of $NaNO_2$ on an industrial scale is:

$$2NaCl+N_2+2O_2 \rightarrow 2NaNO_2+Cl_2$$

Sodium chloride may be prepared from sea water, salt lakes, or NaCl mineral deposits. Nitrogen and oxygen can be sourced from the atmosphere. In practice, the above synthesis process may be carried out as follows:

TABLE 1

| Reaction | Process | Reaction Identifier |
|---|---|---|
| 2[2NaCl (aq) + 2H$_2$O → 2NaOH (aq) + H$_2$ (g) + Cl$_2$ (g)] | chlor-alkali process | A |
| 2[2H$_2$O (l) → O$_2$ (g) + 2H$_2$ (g)] | electrolysis of water | B |
| 2[N$_2$ (g) + 3H$_2$ (g) → 2NH$_3$ (g)] | Haber-Bosch process | C |
| 1[4NH$_3$ (g) + 5O$_2$ (g) → 4NO (g) + 6H$_2$O (l)] | oxidation of NH$_3$ | D |
| 1[2NO (g) + O$_2$ (g) → 2NO$_2$ (g)] | oxidation of nitric oxide | E |
| 2[2NaOH (aq) + NO$_2$ (g) + NO (g) → 2NaNO$_2$ (aq) + H$_2$O (l)] | NaNO$_2$ synthesis reaction | F |

TABLE 1-continued

| Reaction | Process | Reaction Identifier |
|---|---|---|
| 2[2 NaCl + N$_2$ + 2O$_2$ → 2NaNO$_2$ + Cl$_2$] | NaNO$_2$ production, Cl$_2$ by-product | |

It can be understood that the above reaction scheme is one of several possible routes to industrial synthesis of $NaNO_2$. In this particular scheme, ⅓ of the $H_2$ required for synthesis of $NH_3$ is derived from the chloralkali process, and ⅔ is provided by electrolysis of water. Reaction steps A, B, and C are non-spontaneous chemical reactions that require the input of energy. Reaction steps D, E, and F are spontaneous chemical reactions.

Still yet another attribute of the radical-ion battery 100 is the very high electrical conductivity of the electrolyte. The electrical conductivity of molten sodium nitrate at 300° C. is 1.40 $\Omega^{-1}$ $cm^{-1}$, which is nearly twice the electrical conductivity of conventional (30% $H_2SO_4$) battery acid (0.73 $\Omega^{-1}$ $cm^{-1}$). Further, unlike battery acid, molten sodium nitrite is a pure substance, and therefore does not suffer from problems with electrolyte stratification. As a further basis of comparison, the best electrolytes in fuel cells have conductivities on the order of 0.1 $\Omega^{-1}$ $cm^{-1}$ and typical conductivities of electrolyte mixtures used in lithium-ion batteries are ~0.01 $\Omega^{-1}$ $cm^{-1}$ at room temperature (increasing by approximately 30-40% at 40° C. and decreasing slightly at 0° C.). Very high electrolyte conductivity in conjunction with highly favorable reaction kinetics, high output voltage (~3 V), and the absence of diluents or other host species equates to very high power density. The relatively low molecular weight of $NaNO_2$ should further translate to high energy density as well.

The theoretical energy density of the radical-ion battery 100 in its fully charged state can be calculated in the following manner. The combined molar volume of Na (s) and $NO_2$ (l) is 23.75+31.73=55.48 $cm^3$ $mol^{-1}$, and the combined molar mass of Na (s) and $NO_2$ (l) is the molecular weight of $NaNO_2$, which is 69.00 gm $mol^{-1}$. Assuming an open circuit voltage of 3.01 V, and $\Delta G$=n F E, this corresponds to theoretical gravimetric and volumetric energy densities of 1.17 kW-hr $kg^{-1}$ and 1.45 kW-hr $liter^{-1}$, respectively.

As with other battery chemistries, the actual gravimetric and volumetric energy densities that can be obtained in practice depend on the balance of plant required, and the extent to which the battery in question contains electrochemically inactive ingredients. It can also be recognized that the importance of a performance metric such as energy density is application dependent and, if applied improperly, may be misleading. Nonetheless, as discussed later, in some potential applications, preliminary figures for theoretical energy density are relevant and informative.

For example, the above figures can be utilized in connection with estimating how much $NaNO_2$ would be needed to meet the demand for grid storage worldwide in a future energy economy based solely on renewable energy (Na and $NO_2$ are then generated from $NaNO_2$ during operation of the radical-ion battery 100). The total rate of energy consumption worldwide, seasonally and diurnally averaged, is on the order of 20 TW.

In a renewable energy scenario based purely on solar energy, the amount of energy storage (E) needed to address the diurnal variability of solar power production is on the order of one third of total daily energy consumption:

$$E = \frac{(2.0 \times 10^{13} \text{ J sec}^{-1})(3600 \text{ sec hr}^{-1})(24 \text{ hr day}^{-1})}{3} = 5.8 \times 10^{17} \text{ J}.$$

The mass of $NaNO_2$ needed to construct such a grid storage system is as follows:

$$m = \frac{(5.8 \times 10^{17} \text{ J})}{(1.17 \text{ kW hr kg}^{-1})(3.6 \times 10^6 \text{ J kW hr}^{-1})(1000 \text{ kg } MT^{-1})} =$$

140 million $MT$.

It can be further noted that the figure of 140 million metric tons (MT) is likely an overestimate of the amount of raw material required, as it is likely that a future all renewable energy economy (if it can be made to happen) would primarily comprise a mixture of wind and solar. This is significant in that many studies have shown that a mixture of solar and wind power tends to cancel out some of the diurnal variability that either energy source would impose otherwise. Lastly, the above calculation is also conservative in that it assumes zero base load electricity production from sources such as hydroelectric power, geothermal power, nuclear power, etc.

To determine whether the above chemical processes could be carried out at sufficient scale to address worldwide requirements for energy storage, there are four issues to be answered: 1) whether the energy consumption of $NaNO_2$ synthesis from raw materials would be prohibitive; 2) whether adequate quantities of chemical feedstock are available; 3) whether the existing chemical industry can handle the required manufacturing throughput; 4) whether there are other waste disposal challenges, and if so, whether these challenges are manageable and affordable.

Regarding the first issue, the change in free energy for the reaction $2NaCl+N_2+2O_2 \rightarrow 2NaNO_2+Cl_2$ is:

$$\Delta G = [2\Delta G_f^o(NaCl) + \Delta G_f^o(N_2) + \Delta G_f^o(O_2)] - [2\Delta G_f^o(NaNO_2) - \Delta G_f^o(Cl_2)]$$

$$\Delta G = [(2 \text{ mol})(-384.1 \text{ kJ mol}^{-1}) + 0 + 0] - [(2 \text{ mol})(-284.6 \text{ kJ mol}^{-1}) - 0] = 199 \text{ kJ}.$$

Therefore, in theory, synthesizing 1 mole of $NaNO_2$ from NaCl, $N_2$, and $O_2$ requires 100 kJ of energy. The corresponding figure for 140 million MT of $NaNO_2$ is as follows:

$$\Delta G = (100 \times 10^5 \text{ J mol}^{-1})(1.4 \times 10^{14} \text{ gm})/(69.0 \text{ gm mol}^{-1}) = 2.0 \times 10^{17} \text{ J}.$$

If $NaNO_2$ could be synthesized at 100% efficiency, this would translate to about 3 hours of electricity consumption:

$$\tau = \frac{2 \times 10^{17} \text{ J}}{2 \times 10^{13} \text{ J sec}^{-1}} = 1 \times 10^4 \text{ sec}$$

In reality, the energy efficiency with which electrical power can be converted into $NaNO_2$ starting from NaCl, $O_2$, and $N_2$ is far lower. The above figures, however, are not prohibitive.

A calculation that provides a realistic assessment of energy consumption for industrial synthesis of $NaNO_2$ is now set forth. As noted earlier, the above reaction scheme for bulk synthesis of $NaNO_2$ is one of several possible. In the present energy economy, the hydrogen required for industrial scale synthesis of ammonia is derived from natural gas, rather than from electrolysis; electrolytic production of hydrogen is somewhat costlier because of the large quantities of electrical power consumed. Thus, for the purposes of this calculation it can be assumed that ammonia production is carried out using the existing infrastructure for ammonia production based on natural gas, and that both the $H_2$ and $Cl_2$ generated as byproducts of the chloralkali process are sold into existing markets to defray some of the cost of $NaNO_2$ synthesis. Accordingly, the natural gas-based form of the Haber-Bosch process currently practiced can be considered a replacement for reactions B and C set forth in Table 1 above.

Production of $Cl_2$ by the chloralkali process requires an estimated energy input of 890 kJ $mol^{-1}$, and yields 2 moles of NaOH plus 1 mole of $H_2$. Each mole of $NH_3$ requires an energy input of 490 kJ, thus:

$2[2NaCl(aq)+2H_2O \rightarrow 2NaOH(aq)+H_2(g)+Cl_2(g)]1880$ kJ;

$2[N_2(g)+3H_2(g) \rightarrow 2NH_3(g)]1960$ kJ.

A combined energy input of 3840 kJ therefore produces 4 moles of $NaNO_2$. Hence, the energy required for industrial scale synthesis of $NaNO_2$ amounts to 960 kJ $mol^{-1}$. To synthesize 140 million metric tons ($1.4 \times 10^{14}$ gm) of $NaNO_2$, the required energy input is:

$\epsilon = (1.4 \times 10^{14} \text{ gm})(9.6 \times 10^5 \text{ J mol}^{-1})/(69.0 \text{ gm mol}^{-1})$
$= 1.9 \times 10^{18}$ J, which corresponds to about one day of electricity production:

$\tau = (1.9 \times 10^{18} \text{ J})/(2.0 \times 10^{13} \text{ J sec}^{-1}) = 9.5 \times 10^5 \text{ sec} = 27 \text{ hr}.$ The above calculations indicate that the one-time expenditure of energy required to synthesize $NaNO_2$ for construction of a radical-ion battery grid storage network is insignificant in the context of equipment intended to last for 30 years ($1 \times 10^4$ diurnal charging cycles). Incidentally, these calculations further indicate that the estimated net energy efficiency for industrial synthesis of $NaNO_2$ is about 10% (100 kJ $mol^{-1}$ theoretical, 960 kJ $mol^{-1}$ actual).

Given that the energy required for $NaNO_2$ synthesis does not constitute an obstacle, issues related to the chemical industry supply chain should be considered. Scarcity of raw materials is a non-issue for the radical-ion battery 100, because world supplies of sodium, nitrogen, and oxygen are for all intents and purposes, unlimited. Synthesis of 140 million metric tons of $NaNO_2$ requires 47, 28, and 47 million metric tons of sodium, nitrogen and oxygen, respectively. The mass of the hydrosphere is estimated to be $1.4 \times 10^{18}$ metric tons, 97% of which is sea water having an average concentration of sodium ions of 1.08% by mass. Thus, the total mass of sodium in the ocean is of the order of $1.5 \times 10^{16}$ metric tons, more than 8 orders of magnitude greater than that required to synthesize 140 million metric tons of $NaNO_2$. The mass of the atmosphere is estimated to be $5.15 \times 10^{15}$ metric tons, of which $4.02 \times 10^{15}$ metric tons comprises nitrogen and $1.08 \times 10^{15}$ metric tons comprises oxygen. The corresponding figures for $N_2$ and $O_2$ required for $NaNO_2$ synthesis are roughly 8 orders of magnitude lower ($2.8 \times 10^7$ metric tons of nitrogen and $4.7 \times 10^7$ metric tons of oxygen, respectively).

Abundant raw material is a necessary but not sufficient criterion for feasibility, however. Whether production of 140 million metric tons of $NaNO_2$ (e.g., between 2016 and 2030) would be a manageable burden for the existing chemical industry should be examined. Current figures for worldwide production of NaCl are approximately 300 million metric tons per year, which corresponds to 120 million metric tons of sodium per year. An additional burden of 3.1 million metric tons of sodium per year between now (2016) and 2030 would, therefore, only constitute a 3% perturbation to NaCl production. Worldwide production of $NH_3$ is currently on the order of 200 million metric tons per year, which corresponds to 160 million metric tons of nitrogen. An additional throughput of approximately 1.9 million metric tons of nitrogen per year between now and 2030 would, therefore, constitute a 1.2% perturbation to $NH_3$ production. The worldwide production of $Cl_2$ by the chloralkali industry is on the order of 70 million metric tons per year. This implies that the sodium throughput of the chloralkali industry is currently 28 million metric tons per year. An additional processing burden of approximately 3.1 million metric tons of sodium per year represents an 11% perturbation to the chloralkali industry. As discussed below, the current growth rates of these industries indicate that such production burdens should be easily manageable. Finally, it can be noted that the list of materials used to fabricate the Na-$\beta$-$Al_2$—$O_3$ separator 206, of which much lower quantities would be required, also does not include any rare elements.

Lastly, the issue of waste generation/disposal can be examined. $Cl_2$ is generated as a by-product of $NaNO_2$ synthesis, as is $H_2$. There is a great deal of demand for these industrial chemicals, such that an 11% increase in their production by the chloralkali industry would not be expected to cause a significant market dislocation. For example, chlorine ($Cl_2$) typically sells for of order $200 per metric ton in bulk, and the chlorine production industry is currently projected to have 4.9% compound annual growth through 2019. For hydrogen production, the compound annual growth through 2019 is projected at 5.9%, and only approximately 4% of hydrogen generation is sourced from the chloralkali process. Thus, an 11% increase in $H_2$ from the chloralkali production can easily be absorbed at current market prices. It can, therefore, be concluded that large-scale production of $NaNO_2$ for applications such as grid storage will not generate by-products that need to be disposed of, nor significantly alter existing markets in the chemical industry, nor place chemical production capacity under significant strain.

Returning now to the internal operation of the electrochemical cell 108, another issue to be discussed with respect to the electrochemical cell 108 is the number of permutations for possible side reactions. In the exemplary embodiment described herein, the chemical species present in the electrochemical cell 108 are Na, $Na^+$, $NO_2^-$, and $NO_2$. The elemental sodium, while reactive, is sequestered from the other chemical constituents by the separator 206. The operating temperature of the electrochemical cell 108 is too low to cause thermal decomposition of the sodium nitrite melt, which only leaves the possibility of unwanted chemistry between the species $Na^+$, $NO_2^-$, and $NO_2$. By definition, the reaction of $Na^+ + NO_2^- \rightarrow NaNO_2$ is not relevant above the melting point of $NaNO_2$ (271 C). The reaction of $NO_2^- + NO_2 \rightarrow NO_2 + NO_2^-$ is irrelevant because it is a null process. There does not appear to be evidence to date of a significant $Na^+ + NO_2$ reaction channel either (which is not surprising, given that $Na^+ + NO_2^-$ does not occur at these temperatures). Dimerization of $NO_2$ into $N_2O_4$ is only observed at a much lower temperature and/or higher pressure than 300° C. at 1 atm. Although extensive dimerization of $NO_2$ into $N_2O_4$ within the $NO_2$ storage tank (the third storage container 106) is expected, this dimerization reaction is readily reversible. At ~300° C., $NO_x$ decomposition processes, such as 2 $NO_2 \rightarrow N_2 + 2 O_2$ are thermodynamically favorable, but not kinetically viable. And although it is anticipated that a minor fraction of $NO_2$ generated in the charging half-reaction will be converted to NO and $O_2$ as a result of thermal decomposition at 300° C., such a reaction also constitutes a null process because NO and $O_2$ will quickly revert back to $NO_2$ at lower temperature en route to the third storage container 106.

This is also true of the reaction $NO_2^- + NO_2 \rightarrow NO_3^- + NO$. To the extent that this reaction occurs, NO evolved may readily be converted back to $NO_2$ by exposure to $O_2$ (e.g., generated in the third reaction step below) and the nitrate ion can be electrochemically oxidized in a manner analogous to the nitrite ion at the anionic electrode to yield $NO_2$ and $O_2$. There is a potential efficiency penalty associated with the reaction $NO_2^- + NO_2 \rightarrow NO_3^- + NO$, however. The following sequence of reactions can be considered:

TABLE 2

| Reaction | Process |
| --- | --- |
| $NO_2^- \rightarrow NO_2$ (g) + $e^-$ | electrolysis of $NaNO_2$ ($E^0$ = 3.49 V) |
| $NO_2^- + NO_2$ (g) $\rightarrow NO_3^- + NO$ (g) | unwanted side reaction occurring in melt |
| $NO_3^- \rightarrow NO_2$ (g) + ½$O_2$ (g) + $e^-$ | electrolysis of $NaNO_3$ ($E^0$ = 4.32 V) |
| NO (g) + ½$O_2$ (g) $\rightarrow NO_2$ (g) | recombination of NO + ½$O_2$ in the gas phase |
| $2NO_2^- \rightarrow 2NO_2$ (g) + $2e^-$ | net conversion of 2 moles of $NO_2^-$ to $NO_2$ (g) |

The numerical values of $E^0$ for electrolysis of $NaNO_2$ and $NaNO_3$ shown above are derived later. In the above sequence of reactions, it requires 3.49 eV+4.32 eV=7.81 eV to convert 2 $NO_2^-$ ions to 2 $NO_2$ molecules (and their corresponding $Na^+$/Na counterparts). In the absence of this unwanted side reaction, the process 2 [$NO_2^- \rightarrow NO_2$ (g)+$e^-$] would only require 3.49 eV+3.49 eV=6.98 eV. Thus, the unwanted side reaction $NO_2^- + NO_2$ (g) $\rightarrow NO_3^- + NO$ (g) potentially imposes an efficiency penalty of 10.6% during the round-trip charging/discharging process. The scientific literature includes a wide range of early fundamental studies pertaining to the electrolysis of various molten salts, one of which in 1970 specifically investigated whether the speculated $NO_2^- + NO_2$ (g) $\rightarrow NO_3^- + NO$ (g) reaction is operative in molten nitrite. For example, one way to test for this hypothesized side reaction is to electrolyze molten sodium nitrite at a potential too low to electrolyze sodium nitrate and wait to see whether a nitrate ion is formed; in the study, a significant effect was not observed. In addition, a speculative electrode reaction 2 $NO_2^- \rightarrow NO_3^- + NO + e^-$ was ruled out.

Therefore, the following can be concluded: 1) If it occurs, the $NO_2^- + NO_2$ (g) $\rightarrow NO_3^- + NO$ side reaction doesn't have the potential to permanently alter the chemical composition of the electrochemical cell 108; 2) if this side reaction does occur to a small extent, a correspondingly small fraction of the 10.6% penalty discussed above will be incurred; 3) $NO_2$ (g) dissolved in molten nitrite likely has a "limited shelf life", which can be considered when choosing whether to pre-dissolve $NO_2$ (g) in the electrolyte 212 prior to discharge in an effort to improve electrode reaction kinetics (discussed below).

It can be noted that the absence of potent catalysts such as platinum in the electrochemical cell 108 reduces the probability that thermodynamically favorable processes, such as 2 $NO_2 \rightarrow N_2 + 2 O_2$ will occur unexpectedly via heterogeneous catalysis.

Yet another point is that both the electrochemical half-reactions include built-in purification processes that occur automatically as chemical reagents are cycled between the charged and discharged state. For example, it can be imagined that the electrochemical cell 108 is commissioned in its fully discharged state, wherein the only reagent present in significant quantity is molten $NaNO_2$. When the radical-ion battery 100 is transitioned from the discharged state to a fully charged state, at the cationic electrode, $Na^+$ ions are transported through the separator 206, collected in the form of pure sodium metal, and then transferred to the Na storage vessel (the first storage container 102). At the anionic electrode, $NO_2$ gas bubbles out of the molten electrolyte 212 and is deposited into the $NO_2$ storage vessel (the third storage container 106). In the case of sodium, the process is somewhat reminiscent of converting sea water to pure water by reverse osmosis through a semi-permeable membrane, and the net effect is similar to electrochemical refining of impure copper into pure copper by a process that is sometimes referred to as "electrowinning".

In the case of $NO_2$, the purification process is more analogous to distillation. Exploitation of such in situ distillation processes to remove ppb levels of transition metal impurities was critically important to the successful development of low-loss optical fibers in the early 1970s, and may contribute to the ease of implementation in the case of the radical-ion battery 100. Once the charging process is complete, whatever residue is left behind may be removed from the chamber 202 if desired. One special case is the nitrate ion impurity, which may instead be electrochemically converted at the anionic electrode. To the extent that the process $NO_3^- \rightarrow NO_2 + \frac{1}{2} O_2 + e^-$ does occur, it has the effect of converting traces of $NaNO_3$ present in the desired starting material to $NaNO_2$ (wherein the small quantities of $O_2$ gas generated can be vented after the $NO_2$ is cold-trapped in the third storage container 106). Accordingly, the starting material for construction of the electrochemical cell 108 can be in the form of $NaNO_2$ or $NaNO_3$ salt, whichever is more convenient or readily available, and purity requirements are unlikely to be stringent.

It can also be anticipated that unlike many battery chemistries, self-discharge is unlikely to be a problem. In the electrochemical cell 108, sodium metal is sequestered from the electrolyte 212 by the separator 206. This physical barrier only allows passage of sodium ions under the influence of an electrical field; elemental sodium cannot leach into the electrolyte 212. Dendritic growth at the cationic electrode is precluded not only by the presence of the separator 206, but also by the fact that sodium metal (melting point of 97° C.) is a liquid at the operating temperature of the electrochemical cell 108. It is also expected that no mechanism for dendrite formation (or metal deposition of any kind) exists at the anionic electrode where the $NO_2^-/NO_2$ interconversion process takes place.

Another attribute of the architecture of the radical-ion battery 100 is that the electrochemical reactions in question can be configured as two-phase processes. This is self-evident in the case of the cationic electrode, where Na metal and Na ions are the only species present. At the anionic electrode, the charging half-reaction $NO_2^- \rightarrow NO_2 + e^-$ also comprises a simple two-phase interaction at the surface of the electrode 208 (and 210). It is to be noted, however, that the discharging half-reaction at the anionic electrode, $NO_2 + e^- \rightarrow NO_2^-$ can also be carried out as a two-phase process because $NO_2$ is substantially soluble in molten sodium nitrite. From the standpoint of chemical kinetics, this is a much more favorable situation than attempting to promote a three-phase electrolyte/$NO_2$ (g)/electrode interaction by bubbling $NO_2$ gas in close proximity to the electrode/electrolyte interface; to some degree a three-phase process would likely constitute a kinetic bottleneck. Rather, the electrochemical cell 108 can be operated like a flow battery, in which molten electrolyte containing pre-dissolved nitrogen dioxide is delivered to the surface of the anionic electrode (208 and 210), and in which the entire chamber 202 (as opposed to just the electrode region) may be formed of a sparging vessel to promote dissolution of $NO_2$ gas in the molten electrolyte 212. In some embodiments, this may be done by bubbling $NO_2$ (g) through the chamber 202, wherein the mean bubble diameter is chosen to be small enough to provide sufficiently fast dissolution kinetics; bubble size affects both the surface-area-to-volume ratio the $NO_2$/electrolyte interface and the bubble residence time (which is inversely proportional to the terminal velocity of the buoyant gas bubbles). In other embodiments, other techniques may be used to promote saturation (or supersaturation) of the electrolyte 212 with $NO_2$ gas. For example, pressurization may be used in manner analogous to forced carbonation of water with $CO_2$ gas.

Another exemplary approach for promoting the kinetics of $NO_2$ dissolution in molten $NaNO_2$ is to exploit the extremely high surface-area-to-volume ratio of nascent bubble formation during the charging reaction at the anionic electrode; in the early stages of bubble formation, the very small diameter of such nascent bubbles implies an extremely high surface-area-to-volume ratio. Taking this a step further, during the charging reaction, as $NO_2$ is formed at the electrolyte 212/anionic electrode interface, the $NO_2$ evolved may either form a bubble or enter solution. The latter outcome may be promoted by ensuring that the electrolyte 212 is adequately circulated to prevent saturation with $NO_2$ gas in the vicinity of the anionic electrode. Bubble-free operation has the further advantage that occlusion of the anionic electrode surface by adherent gas bubbles, which adversely affects electrode kinetics, is avoided. During periods of rapid charging, however, the rate at which $NO_2$ is evolved may exceed the rate at which it can be absorbed (solvated) by the electrolyte 212. For this reason, it may prove advantageous to exploit solvation of $NO_2$ as it is evolved at the anionic electrode in conjunction with $NO_2$ sparging of the chamber 202 and/or other methods described earlier.

In yet another exemplary embodiment, a more conventional approach in which the $NO_2 + e^- \rightarrow NO_2^-$ half-reaction is carried out at a triple-phase boundary (electrolyte/$NO_2$/electrode) may be used. For example, at least an interior wall of the housing 208 can be a stainless steel electrode fabricated from sintered stainless steel particles to create a porous, high-surface-area-to-volume structure, including a hollow interior that functions as an $NO_2$ gas manifold. $NO_2$ gas bubbling out of such a porous structure would naturally form a large number of electrolyte/$NO_2$ (g)/electrode triple-phase boundary sites that are automatically replenished as $NO_2$ (g) is consumed. One skilled in the art will recognize designs for electrodes that are adapted to promote such triple-phase boundary electrolyte/gas/electrode interactions.

Further, in an exemplary embodiment, all three of the above mechanisms may be employed in the exemplary electrochemical cell 108: 1) $NO_2$ (g) sparging of the molten $NaNO_2$ electrolyte reservoir; 2) solvation of nascent $NO_2$ bubbles as they are evolved at the anionic electrode; and 3) use of a porous $NO_2$ (g) bearing electrode made of sintered metal (or other structure adapted to promoting the triple-phase boundary electrolyte/gas/electrode interaction), to ensure optimal handling of different operating regimes (e.g., fast charging versus trickle charging). It can be anticipated that the ability to pre-dissolve large quantities of $NO_2$ (g) in the electrolyte 212 prior to a discharge cycle, so as to allow the discharging half-reaction at the anionic electrode be carried out as a two-phase process, may: 1) be the preferred mode of operation for minimizing irreversibility at the anionic electrode; and 2) facilitate very high discharge rates (e.g., very high power density) in applications that occasionally demand high bursts of currents.

It can be ascertained that the "shelf life" of $NO_2$ dissolved in molten $NO_2^-$ may have a bearing on successful application of such a pre-dissolution strategy (although perhaps less so for some of the lower operating temperature embodiments discussed below).

As implied above, the anionic electrode can be adapted to allow for efficient operation for both the charging half-reaction $NO_2^- \rightarrow NO_2$ (g)+$e^-$ and the discharging half-reaction $NO_2$ (g)+$e^- \rightarrow NO_2^-$. In some applications, the use of separate, individually optimized, anionic electrode structures adapted for optimal charging and discharging performance, respectively, are contemplated. Further, multiple electrodes may be used, as may composite electrode structures comprising high-electrical-conductivity structures adapted for the minimization of electrode resistive losses, in conjunction with other specialized structures, such as coatings adapted to improvement of electrode kinetics, prevent corrosion, etc.

In other exemplary embodiments, use of low-melting electrolyte mixtures are contemplated, as well as elevated pressure, to increase the solubility of $NO_2$ in the electrolyte 212. In still further exemplary embodiments, use of low-melting electrolyte mixtures, elevated pressure, or both can be used to render $NO_2$ as a liquid rather than a gas in one or more portions of the electrochemical cell 108. In one such embodiment, liquefied $NO_2$ can be delivered through a porous anionic electrode. In another exemplary embodiment, $NO_2$ (l) and the molten electrolyte 212 comprise partially or fully miscible liquids. In still yet another exemplary embodiment, the electrochemically active portion of the electrolyte 212 (e.g., $NaNO_2$ in a Na/$NaNO_2$/$NO_2$ radical-ion battery) is liquefied and dissociated into free ions by dissolution in a solvent, rather than by melting. In one such embodiment, $NO_2$ (l), which is a well-known aprotic solvent that exists in equilibrium with its dimer $N_2O_4$, can be used for this purpose. This can entail the use of $NO_2$ (l) at a pressure of 1 atm, in which case the boiling point of $NO_2$ is 21 C, or the use of elevated pressure to enable operation at higher temperatures. For example, at a pressure of 20 atm, the boiling point of $NO_2$ is approximately 100 C. In yet another exemplary embodiment, $NO_2$ generated by the charging reaction (e.g., $NaNO_2 \rightarrow Na + NO_2$), can be stored in the electrolyte 212 rather than in a separate reservoir.

Storage and safety considerations are now discussed. The ease with which the chemical reagents in question can be stored is important. Hydrogen, for example, can be readily generated by electrolysis of water, but is difficult to store economically. A closely related consideration is safety. Storing large quantities of chemically energetic reagents is potentially very dangerous.

From the standpoint of economic storage, the reagents in question, ideally, are pumpable liquids that can be stored at atmospheric pressure in containers of relatively lightweight construction and fabricated from inexpensive materials (e.g., steel). From the standpoint of safety, such storage systems are desirably failsafe (e.g., in the event of a sustained power outage), and use of chemical reagents having persistent toxicity with respect to personnel or the environment are to be avoided. As outlined below, the reagents in the radical-ion battery 100 meet such requirements.

Sodium nitrite is a stable, non-volatile solid that is easily contained. $NaNO_2$ exhibits moderate toxicity, but spills can be cleaned without specialized equipment, and any residue can be neutralized through inorganic reactions, such as:

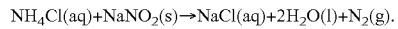

$NH_4Cl(aq)+NaNO_2(s) \rightarrow NaCl(aq)+2H_2O(l)+N_2(g)$.

Sodium metal can be stored as a solid at room temperature, as a liquid above 97 C, and is chemically compatible with materials such as stainless steel. A risk associated with accidental release of sodium metal is fire, via either reaction with oxygen or water. Environmental toxicity is not a significant concern because sodium readily converts to sodium hydroxide (NaOH) and subsequently sodium bicarbonate ($NaHCO_3$) upon exposure to the atmosphere. From the standpoint of safety, an objective is to prevent a situation in which a large quantity of sodium metal gains access to a large quantity of water or air, generating large quantities of heat and/or hydrogen gas, that would set the stage for a runaway process in which the entire reservoir of sodium metal is consumed by fire. This objective can be achieved by positioning the first storage container 102 underground (e.g., the first storage container 102 is an underground tank) beneath an inert fill material such as dry soil or sand. In the event of a breach, the rate at which fugitive sodium accesses air or water would be very limited, thereby preventing buildup of heat. Accordingly, if a hole were to be punched in an underground storage tank containing liquid sodium metal (e.g., stored at 100 C), in the presence of dry fill materials such a storage container would likely exhibit a self-healing property in which liquid sodium would quickly freeze upon contact with the fill medium, and then gradually form a chemically inert "scab" of sodium hydroxide and/or sodium bicarbonate by reacting with small quantities of air/humidity present. Further, the fact that the first container 102 is buried underground would only permit a "slow burn", providing time to pump much of the remaining liquid sodium to another storage container. The site can also be equipped with cylinders of compressed inert gas such as nitrogen that can be vented (at a moment's notice) to the base of the fill column, forcing inert gas to percolate up through a granular fill material such as dry sand.

Nitrogen dioxide gas is quite toxic, but on the other hand, it is not persistent in the environment or in the human body. From the standpoint of safety, a situation to be avoided is the release of a large plume of $NO_2$ into the surrounding atmosphere that would endanger people in the vicinity of such a facility. Fortunately, $NO_2$ can be liquefied at atmospheric pressure at temperatures below 21.2 C, thereby eliminating scenarios in which large quantities of $NO_2$ gas rapidly escape because the $NO_2$ storage vessel is under positive pressure. On the contrary, liquefied $NO_2$ can be stored as a liquid in a failsafe manner in underground storage tanks that are passively maintained at the temperature of the surrounding soil. Thus, the third storage tank 106 can be positioned underground, and can be at ambient temperature. In the event of a leak in the third storage container 106, the contents of the third storage container 106 can be pumped to another container. In addition, the density of $NO_2$ gas is significantly greater than air, which causes it to settle and hug the ground. Accordingly, the third storage container 106 can be surrounded by a berm to contain fugitive $NO_2$ that might percolate upward through the fill medium in the event of a breach, equipped with a $NO_x$ sensor to activate a chemical neutralization system (e.g., an alkaline aqueous mist). At the same time, a pump can be actuated to transfer the contents of the third storage container 106 to another (adjacent) storage container.

As noted earlier, $NO_2$ exists in chemical equilibrium with its dimer, $N_2O_4$, which shifts in favor of $N_2O_4$ at low temperature and/or high-pressure. Accordingly, the terms $NO_2$ and $N_2O_4$ are sometimes used loosely and interchangeably in situations where both species actually coexist. Alternatively, the notation "$NO_2/N_2O_4$" may be encountered. In this description, it is to be understood that any reference to $NO_2$ (g), $NO_2$ (l), and $NO_2$ (s) represents simplified notation, wherein, it is understood that the material in question may comprise some or substantially all of the $NO_2$ dimer, $N_2O_4$ (e.g., when liquefied).

Returning to $NO_2$ storage, it can be noted that in some geographic regions, the soil temperature may be comparable to or slightly in excess of the boiling point of $NO_2$ (l). Under such circumstances, a container of $NO_2$ (l) would be expected to maintain a gentle boil. In some embodiments, this $NO_2$ boil-off may simply be diverted to the second storage container 104 (comprising molten $NaNO_2$) for pre-dissolution. In another exemplary embodiment, suppression of boiling may exploit the fact that $NO_2$ (l) is a fairly effective aprotic solvent, such that one or more solute additives may be added to affect $NO_2$ (l) boiling point elevation. In various embodiments, such boiling point elevation additives may comprise solutes that exhibit no chemical reactivity towards $NO_2$ and/or solutes having very low vapor pressure (e.g., inorganic salts), such that substantially pure $NO_2$ (g) may be withdrawn from the third storage container 106 without concern for contamination by such solutes. In other embodiments, a cooling system such as a heat pump may be used for thermal management of the third storage container 106. This may include cooling or freezing a portion of the $NO_2$ (l) in the third storage container 106 during periods of excess electricity production. The freezing point of $NO_2$ (l) is $-11.2°$ C. The third storage container 106 can be insulated, such that a mixture of $NO_2$ liquid and $NO_2$ "ice" remains in the condensed phase for an extended period of time.

It is further to be understood that, in some embodiments, pressurization, instead of or in addition to cooling, may be used to facilitate $NO_2$ storage. For example, depending on the application and the size of the third storage container 106, the third storage container 106 can be pressurized (e.g., without any form of temperature control). In another example, a stream of $NO_2$ gas (such as that generated by boil off) may be pressurized, allowed to cool and subsequently liquefy, and then added to the third storage container 106 so as to affect refrigeration. In yet another exemplary embodiment, electrolytic production of $NO_2$ during the charging process may be used to pressurize the third storage container 106 as an alternative to a compressor.

Both $NO_2$ and sodium metal have another desirable property, namely that all traces of material may be removed from their storage containers by heating the walls of the containers and cold trapping the Na or $NO_2$ vapor. This facilitates periodic inspection of containers, which is desirable from the standpoint of preventing breaches of containment and gathering data regarding what, if any, unexpected storage degradation mechanisms may be operative under certain circumstances.

Another potential vulnerability that can be managed concerns the possibility of a breach of the separator 206. For example, the separator 206 can be a ceramic sodium-beta-alumina membrane. In the event that the separator 206 is compromised (e.g., by a hairline fracture), the prospect of a violent chemical reaction in which the molten sodium metal comes into contact with the molten $NaNO_2$ electrolyte must be considered. In the event that such a breach occurs, the resulting change in cell voltage can be immediately detected, and the electrochemical cell 108 can be isolated by closure of valves and opening of electrical connections. Other counter measures such as rapid draining of the electrolyte 212 from the electrochemical cell 108 can also be employed. Another concern is that if a sufficiently large quantity of sodium comes into contact with the electrolyte 212, enough heat may be generated to further damage the separator 206, accelerating combustion and resulting in a runaway process.

To make such a system failsafe, physical separation of the electrochemical cell 108 from the storage containers 102-106 is contemplated, such that a complete and catastrophic failure of the electrochemical cell 108 would not result in damage to the storage containers 102-106. The electrochemical cell 108 can also be located underground, surrounded by inert fill material (or in some other secondary containment vessel) to prevent access to atmospheric oxygen, which could otherwise accelerate combustion. Another exemplary countermeasure is to keep the quantity of sodium metal residing in the electrochemical cell 108 to a minimum at all times. In principle, only a relatively thin coating of sodium metal on one side of the separator 206 is necessary for the electrochemical cell 108 to function properly. For example, the separator 206 may comprise a planar surface of horizontal orientation whose top surface is wetted with a thin layer of sodium metal. The thickness of the sodium layer can be maintained by an active control system, or can be passively regulated by the presence of geometric constraints (e.g., a planar metal plate located above the planar separator plate, spaced a short distance apart). In a similar manner, coaxial metal and sodium-beta-alumina tubes having a predetermined gap distance can be used to accomplish the same objective. In another embodiment, the appreciable vapor pressure of sodium metal at the operating temperature of the electrochemical cell 108 can be exploited, wherein sodium vapor (rather than molten sodium metal) can be delivered to the sodium side of the sodium-beta-alumina membrane (e.g., equipped with a current collecting wire mesh), thereby keeping the amount of sodium metal present to an absolute minimum. Although the use of sodium vapor would reduce the chemical activity of Na at the separator 206, in some applications, the resulting kinetic and thermodynamic penalties may not be prohibitive in quantitative terms (e.g., because of other rate limiting processes).

Issues relating to transmission are now described. As noted above, in some potential applications, preliminary figures for theoretical energy density can be both relevant and informative. The case of a utility-scale solar or wind power installation situated in a location that is not connected to the rest of the electric grid by high-capacity electrical transmission lines, but is connected by railroad, is now considered. In a proposed embodiment, sodium metal and liquefied $NO_2$ generated at a geographically remote site can be shipped by rail and tank cars to one or more destinations having electrical transmission lines of appropriate capacity, where the electrochemical reaction $Na+NO_2 \rightarrow NaNO_2$ is used to generate electrical power. The same railway can then be used to ship the resulting $NaNO_2$ back to the remote site (e.g., in granular or molten form) to complete the cycle. Whether or not such a scheme could provide a cost-effective means to sidestep the transmission line problem depends in large part on the theoretical energy density of the electrochemical reaction $Na+NO_2 \rightarrow NaNO_2$.

When assessing shipment of materials by rail, it is instructive to view the coal industry. The vast majority of coal that is mined in the United States is used to generate electricity, and coal-fired power plants currently provide approximately 35% of all electricity generated. At its inception, the coal industry faced a problem similar to that which confronts renewables such as solar and wind today from the standpoint of utility-scale production of electrical power. The locations of many large deposits of high-quality coal do not coincide with the geographic locations of major population centers. In the coal industry, this geographic disparity between supply and demand may amount to many hundreds of miles. In some instances, it has proven economical to construct remote "mine mouth" coal-fired power plants connected to population centers by high capacity electrical transmission lines. But as explained below, in many instances this approach is not economically viable.

Coal-fired power plants tend to be thought of as having two inputs, coal and atmospheric oxygen, and two outputs, electrical power and $CO_2$ emissions. In reality, the situation is more complicated. Vast quantities of water are required to operate coal-fired power plants and significant quantities of ash, particulates, sulfur dioxide, and heavy metals are produced as by-products. In some instances, where cheap coal and cheap water happened be co-located, the construction of dedicated transmission lines may be given serious consideration. In most cases, however, it has proven more practical to transport coal by rail to population centers or other major grid tie points having ample access to water, and forgo the construction of coal-fired power plants in remote locations. For instance, coal that is mined in rural Wyoming may be transported by rail to a location as far away as Georgia, more than 1500 miles away. The same freight train then makes a return trip from Georgia to Wyoming empty (or in some cases, lightly loaded with coal ash). It can be noted that a further consideration is the substantial transmission losses that would be incurred for such long distance electrical transmission lines, which are typically of order 1.5% per 100 miles.

It is fortunate for the coal industry that the economics of coal transport by rail as a substitute for high-capacity electrical transmission lines turns out to be viable; otherwise much of the inventory of coal in countries such as the United States would be stranded from the standpoint of utility-scale electrical power generation. That the transport of coal by rail over very long distances is economically viable reflects several factors: 1) rail transport is energy efficient (1 gallon of diesel fuel may be used to transport a ton of cargo a distance of order 450 miles due to low rolling resistance, low aerodynamic drag, and relatively high efficiency of large diesel engines); 2) coal, which for all intents and purposes is pure carbon, has very high energy density; 3) atmospheric oxygen provides 73% by mass of the reactants required for the combustion reaction $C+O_2 \rightarrow CO_2$; and 4) the capital investment for constructing railroads (while large) is not prohibitive when appropriately amortized.

Coal transport by rail is now examined in more quantitative terms. According to the U.S. Energy Information Administration (EIA), one ton of coal burned in a modern coal-fired power plant generates 1.90 MW-hr of electricity. If it is assumed that an average capacity of a modern coal gondola car is 120 tons, and the average length of a coal freight train is 120 cars, this corresponds to 27.4 GW hours of electricity per trainload of coal. Thus, a single daily shipment of coal can be used to operate a power plant with an average output power on the order of 1 GW. This is the yardstick that can be used to conduct a preliminary assessment of $Na/NO_2$ rail transport.

In the case of renewables such as solar and wind, the regulatory hurdles for construction of new long-distance electrical transmission lines are often formidable. In contrast, the vast majority of existing railroad right-of-ways were established 50 to 150 years ago, and are therefore not a source of contention. Moreover, there is ample precedent for shipment of bulk quantities of hazardous materials, such as molten sodium and liquefied nitrogen dioxide by rail. Evidently, the engineered safety systems required for safe transport of such hazardous cargo, which have gradually evolved over the last 150 years, do not represent an added financial burden that is prohibitive. In fact, this has proven to be the case for rail transport of a wide variety of hazardous substances, many of which are considerably more dangerous than sodium metal and nitrogen dioxide. Well known examples include chlorine, anhydrous ammonia, ethylene oxide, vinyl chloride, anhydrous hydrogen fluoride, anhydrous hydrogen chloride, hydrogen cyanide, nitrosyl chloride, methyl bromide, sulfur dioxide, sulfur trioxide, phosgene, methyl mercaptan, hydrogen sulfide, bromine, phosphorus trichloride, fuming nitric acid, fuming sulfuric acid, concentrated hydrogen peroxide (52%), liquid hydrogen, acetylene, liquid oxygen, liquefied petroleum gas, diioscyanate, titanium tetrachloride, dimethyl sulfate, ethyl trichlorsilane, chlorosulfonic acid, acetone cyanohydrin, and molten sulfur (maintained at 140 C).

In the United States, molten sodium metal is transported by rail in DOT 105J300 W tank cars having a name plate capacity of 33,600 gallons, with 5% outage (also known ullage) to allow for thermal expansion of the liquid contents. Liquefied nitrogen dioxide is transported in DOT 105A500 W tank cars with a name plate capacity of 20,500 gallons and a required outage of 2%.

The stoichiometry of the $Na+NO_2 \rightarrow NaNO_2$ reaction dictates:

$$n_{Na}=n_{NO2}$$

where n is the number of moles of each reagent. In terms of the number of railcars used for each reagent (N), the volumetric capacity of each railcar (V), the fill factor (f), reagent density ($\rho$), and molar mass of each reagent (M), the above expression can be written as follows:

$$\frac{N_{Na}V_{Na}f_{Na}\rho_{Na}}{M_{Na}} = \frac{N_{NO2}V_{NO2}f_{NO2}\rho_{NO2}}{M_{NO2}}$$

A further constraint on the number of train cars allowed per train can further be imposed:

$$N_{Na}+N_{NO2}=N_{tot},$$

where $N_{tot}=120$ is proposed for the purpose of comparison to the coal industry. The theoretical ratio of Na railcars to $NO_2$ rail cars is:

$$\frac{N_{Na}}{N_{NO_2}} = \frac{V_{NO_2}f_{NO_2}\rho_{NO_2}M_{Na}}{V_{Na}f_{Na}\rho_{Na}M_{NO_2}} =$$

$$\frac{(20,500 \text{ gal } car^{-1})(0.980)(1.88 \text{ g cm}^{-3})(23.0 \text{ g mol}^{-1})}{(33,600 \text{ gal } car^{-1})(0.950)(0.927 \text{ g cm}^{-3})(46.0 \text{ g mol}^{-1})} = 0.638$$

For a 120 car train:

$$N_{NO_2} = N_{tot}\left(\frac{N_{NO_2}}{N_{NO_2} + N_{Na}}\right) =$$

$$\frac{N_{tot}}{1 + \frac{N_{Na}}{N_{NO_2}}} = \frac{N_{tot}}{1 + \frac{V_{NO_2} f_{NO_2} \rho_{NO_2} M_{Na}}{V_{Na} f_{Na} \rho_{Na} M_{NO_2}}} = \frac{120}{1 + 0.638} = 73.3 \approx 73$$

The stoichiometry of the $Na+NO_2 \rightarrow NaNO_2$ reaction therefore dictates that a 120 car train includes 73 $NO_2$ rail cars and 47 Na rail cars.

The amount of stored energy carried by such a $Na/NO_2$ trainload can be determined. The total volume of the $Na/NO_2$ payload is:

$$V_{payload} = [(20{,}500 \text{ gal car}^{-1})(0.98)(73 \text{ cars}) + (33{,}600 \text{ gal car}^{-1})(0.95)(47 \text{ cars})](3.79 \text{ l gal}^{-1})$$

$$V_{payload} = 1.12 \times 10^7 \text{ liters}$$

The total energy of the 120 car payload is therefore:

$$E_{payload} = (1.45 \times 10^3 \text{ W hr liter}^{-1})(1.10 \times 10^7 \text{ liters}) = 1.60 \times 10^{10} \text{ W hr}$$

The 16.0 GW-hr figure calculated for a 120-car train carrying $Na/NO_2$ is 58% of the 27.4 GW-hr figure calculated for a 120-car coal train (despite the enormous advantage that coal enjoys because 73% of the mass of reactants required for the chemical reaction $C+O_2 \rightarrow CO_2$ comprises ambient atmospheric oxygen that need not be transported). It can therefore be concluded that the high energy density of the $Na+NO_2 \rightarrow NaNO_2$ reaction should make it feasible to circumvent the transmission problem that currently confronts renewables such as solar and wind by using rail in a manner analogous to the coal industry.

There are additional details that can be considered with respect to shipping the aforementioned chemicals by rail. Some are relatively minor and will not alter the conclusion that the energy content of the rail shipment containing coal and a rail shipment containing $Na/NO_2$ are of comparable magnitude. For example, the efficiency with which the electrochemical reaction $Na+NO_2 \rightarrow NaNO_2$ may be carried out in practice is somewhat less than 100% (although on theoretical grounds, very low overpotentials are predicted for the radical-ion reactions at both electrodes, and therefore very high charge/discharge efficiency). It is also noted that the mass of the $Na/NO_2$ payload:

$$m = (2.18 \times 10^{10} \text{ W hr})/(1.17 \times 10^3 \text{ W-hr kg}^{-1}) = 1.86 \times 10^7 \text{ kg} = 20{,}500 \text{ tons}$$

is 42% larger than the 14,400 ton coal payload referred to earlier, which would result in somewhat higher fuel costs. The energy penalty of heat losses should also be taken into consideration if one or more reagents are shipped above ambient temperature in thermally insulated tank cars. Heat loss will later be examined in quantitative terms. It may be preferable to operate separate Na and $NO_2$ rail shipments to provide an added margin of safety in the event of a derailment.

When analyzing the feasibility of shipping of $Na/NO_2$, a feasibility analysis should include economic benefits of drastically reduced $CO_2$ emissions, drastically reduced water consumption, elimination of unwanted byproducts such as sulfur dioxide, heavy metals, particulates, and coal ash, elimination of soil remediation projects at the mine site, etc. Such an economic analysis can also include cost-savings realized by reclaiming steel and other materials from obsolete rolling stock and rails should a gradual transition from coal to renewable energy take place.

A first-order consideration regarding shipment of $Na/NO_2$ by rail, however, is the return trip. As mentioned earlier, in the coal industry the returning freight train comprises empty cars, or in some cases, gondola cars lightly loaded with coal ash. In the case of $Na/NO_2$ by rail, the entire mass of the Na and $NO_2$ reagents must be returned in the form of sodium nitrite, instead of just empty tank cars. Moreover, the possibility that rail tank cars suitable for transport of molten sodium and liquefied nitrogen dioxide may, for one or more reasons, be unsuitable for transporting $Na/NO_2$ should be considered. A worst-case analysis may therefore assume that the $Na/NO_2$ train would have to be returned empty (analogous to what is done in the coal industry), and an additional train of comparable capacity is therefore required to haul $Na/NO_2$ (and returned empty) in the opposite direction.

Alternatively, it may prove feasible to repurpose the Na and $NO_2$ tank cars for $NaNO_2$ transport. The molar volume of molten $NaNO_2$ is $V_{molar\ (NaNO_2)} =$ 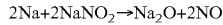 $[69.00 \text{ gm mol}^{-1}]/[1.82 \text{ gm cm}^{-3}] = 37.9 \text{ cm}^3 \text{ mol}^{-1}$, whereas the combined molar volumes of $Na+NO_2$ amount to 55.5 $cm^3$. The fact that the molar volume of $NaNO_2$ is only 68% that of $Na+NO_2$ separately, in addition to the fact that tank car outage is expected to be unnecessary for transport of granular $NaNO_2$, indicate that a randomly packed polydispersed mixture of granulated/powdered $NaNO_2$ can be fit into the available volume of the $Na+NO_2$ tank cars. Alternatively, the $NaNO_2$ payload can be loaded into the cars in molten form, and either allowed to solidify (or partially solidify), or kept molten at approximately 275° C. for the duration of the return trip.

In any scenario involving the reuse of Na and $NO_2$ railcars for return transport of $NaNO_2$, substantially all of the Na and $NO_2$ must be purged from each tank car prior to introducing $NaNO_2$. In particular, molten $NaNO_2$ and molten Na metal are known to react violently. A reaction such as:

$$2Na + 2NaNO_2 \rightarrow Na_2O + 2NO$$

also converts elemental Na to electrochemically inactive oxide species such as $Na_2O$, will result in net loss of $NO_2$ if the NO evolved is not recovered, and would likely cause spattering of molten material. There is also potential for $NO_x$ termination reactions that result in irreversible formation of $N_2$.

In the case of $NO_2$, the tank car can be emptied gravimetrically or under positive pressure, and residual traces of $NO_2$ can be removed by evaporation, cold trapping, etc. In the case of molten sodium, methods for complete removal of residual sodium metal can be implemented. An exemplary approach is the use of gravimetric draining (e.g., sloped surfaces that lead to a drain) in conjunction with super-hydrophobic interaction between the wall of the tanker and its liquid contents. The exploitation of super-hydrophobic surface interactions to facilitate removal of all traces of liquid via gravimetric drainage, while somewhat counterintuitive, is well known. A contact angle greater than 150° can be used to designate the transition from hydrophobic and super-hydrophobic wetting behavior. The super-hydrophobic interaction is such that residual liquid assumes the shape of nearly spherical droplets that roll along the super-hydrophobic surface like miniature ball bearings. In the case of liquid sodium, there are a number of common materials that naturally exhibit high wetting angles. Nickel-coated surfaces, for example, are super-hydrophobic with respect to liquid sodium metals at temperatures below 360 C. Alternatively, the use of granulated $NaNO_2$ can be used to prevent wetting of interior surfaces of the tank car by sodium nitrite.

When the radical-ion battery 100 is employed to address grid storage and transmission problems that currently confront renewable energy, a single type of rail car can be developed that is configured to transport (and conveniently purge) molten sodium, liquid nitrogen dioxide, and molten sodium nitrite. For instance, a coating can be implemented that is super-hydrophobic with respect to both molten sodium and molten sodium nitrite and also non-reactive with respect to nitrogen dioxide. In another example, a coating material such as nickel can be used that is super-hydrophobic with respect to molten sodium and non-reactive with respect to nitrogen dioxide, wherein molten sodium nitrite is gravimetrically drained and residual traces of solidified $NaNO_2$ are removed by dissolution in water. It can be noted that molten sodium nitrite has a viscosity of only 3.0 centipoise at 300 C and therefore drains in a manner similar to water (for comparison, water has a viscosity of 1.0 centipoise and isopropyl alcohol has a viscosity of 2.0 centipoise at room temperature).

In a related embodiment, only rail cars used to transport $NO_2$ (l) are used for transport of $NaNO_2$ (l) on the return trip. This avoids the problem of chemical incompatibility between Na and $NO_2$, and the problem of chemical incompatibility between Na and $NaNO_2$. On the other hand, traces quantities of $NO_2$ in a tank car filled with molten $NaNO_2$ do not present a chemical compatibility problem. Likewise, traces quantities of $NaNO_2$ in a tank car filled with liquefied $NO_2$ do not present a problem. The slightly higher molar volume of molten $NaNO_2$ (37.9 $cm^3$ $mol^{-1}$) vs. that of $NO_2$ (31.7 $cm^3$ $mol^{-1}$) would necessitate ~20% outage in the tank cars carrying liquefied $NO_2$, but the resulting simplification of tank car design potentially offsets the slight diminution of energy carrying capacity per train load that would result.

Comparing the transport cost of $Na/NO_2/NaNO_2$ and coal entails considering two possible scenarios: 1) Transportation costs are nearly double that of coal because separate trains are required for the front-haul ($Na/NO_2$) and backhaul ($NaNO_2$) journeys; on average 50% of the rolling stock travels empty; 2) the same train cars may be used for the front-haul and backhaul journeys.

The breakdown of expenses for rail transport are such that the incremental cost of running a return train fully loaded rather than empty may only amount to 30%. An in-depth analysis may determine that the incremental cost for scenario 1 is 80% and the incremental cost of scenario 2 is 30%, relative to the baseline case of a single train that travels one direction fully loaded and the other direction empty. The relative impact of such cost increments depends on whether transport costs are at present a minor or major component of the overall cost of coal generated electricity. According to the EIA, the estimated average cost to transport coal by rail in the U.S. was $17.25 per short ton in 2010. The EIA also estimates the levelized cost of energy for conventional coal power plants to be 9.5 cents per kW-hr. It was noted earlier that one ton of coal burned in a modern coal-fired power plant generates 1.90 MW-hr of electricity. The revenue from electricity sales then, per ton of coal is:

$$R=(1.90\times10^3 \text{ kW-hr/ton})(\$0.95/\text{kW-hr})=\$180/\text{ton}$$

Apparently, the transportation cost of coal is on the order of 10% of coal generated electricity revenue. This indicates that increasing transportation costs by 30% to 80% under scenarios 1 and 2, while not insignificant, does not fundamentally alter the economics of transporting the chemical reagents of the radical ion battery 100 by rail.

Thermal management considerations also exert an influence on how rail transport can be implemented. The question of whether transport of $NaNO_2$ as a granular solid or molten liquid is considered. As mentioned earlier, the granular solid form of anhydrous $NaNO_2$ has the advantage that it would not wet the interior surface of the tank car, and would therefore be easy to purge. This can be a nickel-plated tank that is super-hydrophobic with respect to molten sodium, suitable for liquefied nitrogen dioxide, and also suitable for transporting granulated $NaNO_2$ on the return trip. In another embodiment, the molten sodium nitrite generated by the electrochemical discharge reaction $Na+NO_2 \rightarrow NaNO_2$ can be loaded from the discharge battery into a thermally insulated tank car (perhaps equipped with heating coils). The $NaNO_2$ payload can then be kept in the molten state (e.g., at 300 C) for the duration of the return trip. This would avoid the need to convert molten salt to powdered/granular salt, provides a packing factor of 100%, and would retain substantially all of the heat contained in the sodium nitrite when adequate thermal insulation is provided.

Thus, two issues to consider are: 1) when uninsulated tank cars are used and the contents are allowed to cool down to ambient temperature during transport, whether (and how much of) an efficiency penalty will be incurred because the contents of the tank car must eventually need to be reheated; 2) when the tank cars are thermally insulated so as to maintain their contents at elevated temperature, whether (and how much of) an efficiency penalty will be incurred as a result of a thermal leakage for a tank car of practical design.

Addressing issue 1, the amount of heat required to raise the temperature of 1 mole of Na, NO, and $NaNO_2$ from T=25 C to $T=T_{final}$, where $T_{final}$ is likely of order 300 C, can be calculated. The molar heat capacity for solid Na is 28.2 J $mol^{-1}$ $K^{-1}$, and the heat of fusion for sodium metal is 2.60 kJ $mol^{-1}$. Data for the molar heat capacity of molten Na (30.8 J $mol^{-1}$ $K^{-1}$) was extracted from the Argonne National Lab report ANL/RE-95/2. $NaNO_2$ exhibits a solid-to-solid phase transition behavior in the vicinity of 165 C, followed by melting at 271 C. It has been determined that the enthalpy required to heat $NaNO_2$ from 25 C to 300 C is 48 kJ $mol^{-1}$. When compared to the free energy of the reaction $Na+NO_2 \rightarrow NaNO_2$ (290.4 kJ $mol^{-1}$ at 300 C), this represents a 17% efficiency penalty. Apparently, allowing the $NaNO_2$ payload to cool to ambient temperature during transport should be avoided if at all possible. The enthalpy required to heat Na from 25 C to 300 C is 11 kJ $mol^{-1}$, an efficiency penalty of 3.8%. Finally, in the case of $NO_2$, it has been found that the enthalpy required to heat $NO_2$ from 25 C to 300 C is 12 kJ $mol^{-1}$, an efficiency penalty of 4.1%.

The heat of vaporization of $NO_2$ is 38.1 kJ, but the boiling point of $NO_2$ is 21 C. Thus, for the discharging cycle, vaporization of $NO_2$ at 21 C can be carried out using extremely low quality heat, which may, for all intents and purposes, cost no energy. Waste process heat and electrical power extracted from the grid during periods of excess electricity production are among numerous options for providing $\Delta H_{vap}$ for $NO_2$ (l). Charging and discharging the radical-ion battery 100 is also potentially a significant source of waste heat, depending on the resistance of the electrolyte 212 and over-voltages present at the anionic and cationic electrodes. The $NO_2$ (l)$\rightarrow NO_2$ (g) conversion process can also be used for thermal management of the inverter circuitry required to convert the DC output of the radical-ion battery 100 to three-phase AC power, thereby also keeping inverter losses to a minimum. On the other hand, it may turn out that in some application settings the most effective source for supplying any required process heat would be some form of solar thermal power. This is driven in part by: (1) the efficiency with which incoming solar radiation may be converted to heat, which is on the order of 5× the efficiency of photovoltaic conversion of sunlight to electricity; and (2) the fact that generation of relatively low quality heat by concentrated solar power (CSP) is inexpensive (because of the relatively modest concentration ratios required to generate temperatures of order 300 C and the lack of requirement for refractory materials used in conventional CSP power plants).

During the charging process, heat is to be removed from $NO_2$ (g) evolved at the anionic electrode to allow $NO_2$ (g) to be condensed to $NO_2$ (l) for storage. In an exemplary embodiment, this heat is simply discharged through a heat exchanger to ambient air, water, or soil. In another embodiment, a heat pump may be used to cool the $NO_2$ (g) while pumping heat back in the electrolyte 212 and/or sodium reservoir (the first storage container 102) to counteract thermal losses to ambient. A bottoming cycle may also be used to recover useful work from hot $NO_2$ (g) evolved at the anionic electrode.

In the case of $NO_2$, temperature cycling is unavoidable if it is desired to store $NO_2$ in liquid form. But in absolute terms, the 4.1% efficiency penalty calculated earlier is not large. Moreover, the prospects for: (1) converting some of this waste heat to useful energy during the charging cycle; (2) harvesting waste heat from charging and discharging of the radical-ion battery 100; and (3) the opportunity to mitigate the problem of inverter thermal management and its associated efficiency penalty during the discharging cycle, are noteworthy.

A further opportunity for harvesting substantial quantities of waste heat arises during rail transport. Conventional diesel electric locomotives make extensive use of dynamic braking. By rerouting some or all of the electrical connections to the dynamic braking load resistors to resistive heating coils located within each tank car, the very large heat capacity of the molten payload may be used to collect large quantities of heat during the course of transit. High temperature diesel exhaust also provides potential source of useful waste heat. For instance, the train can depart with its molten contents of 280 C (the melting point of $NaNO_2$ is 271 C), and arrive at its destination with its molten payload of 310 C. In a related embodiment, one or more rail cars dedicated to the sole purpose of thermal storage (rather than transporting chemical reagent) may be located directly behind the locomotive(s) to facilitate convenient and efficient collection and storage of waste heat from diesel exhaust and/or dynamic braking for later use at destination. In light of such opportunities, the relatively small amount of low-grade heat associated with temperature cycling of $NO_2$ may amount to an efficiency penalty that is effectively zero. In the case of $NaNO_2$ and Na, however, the above calculations indicate that a combined efficiency penalty of 21% can be avoided by maintaining both reagents at operating temperature (e.g., 300 C) at all times. This requires that the proposed thermally insulated tank cars exhibit very little heat loss. Accordingly, a calculation can be made as to whether or not this is a realistic expectation. First, the amount of heat loss expected for each daily trainload of molten $NaNO_2$ can be estimated and compared to the amount of electrochemical energy stored in each daily trainload of $Na/NO_2$ traveling the opposite direction.

Existing precedents in rail transport are contemplated in an attempt to ensure realistic calculations. There are, for instance, vacuum insulated tank cars used to transport cryogenic materials such as liquid hydrogen (LH2) at −253 C that are designed to keep heat transfer from ambient to an absolute minimum. For a standard 7711 kg capacity LH2 tank car, typical boil-off rates are 0.3 to 0.6% per day. The heat of vaporization of hydrogen is 0.904 kJ mol$^{-1}$ and the density of LH2 is 0.071 g cm$^3$. The above numbers translate to 110,000 liters of LH2 per tank car with a heat loss of 10-20 MJ/day. It was previously calculated that the volume of the Na/$NO_2$ payload for a 120 car train was $1.1 \times 10^7$ liters, and that the molar volume of $NaNO_2$ is 77% that of Na+$NO_2$ stored separately. Accordingly, 80 DOT113 tank cars would be needed to transport the molten $NaNO_2$ on the return trip. This corresponds to 0.8-1.6 GJ day$^{-1}$ of heat loss for the entire 80 car trainload of LH2 and represents the combined effects of heat transfer by radiation and conduction.

However, the amount of heat transfer that would be observed in the case of molten $NaNO_2$ is of interest, rather than cryogenic LH2. To infer this information on the basis of existing LH2 tank cars, the details of their construction are considered. Super-insulated tank cars such as those used to transport cryogenic fluids use a double-walled hull containing what is referred to as "multi-layered insulation" (MLI). A typical MLI blanket employs 10 to 100 metallized polymer films separated by polyester mesh. For an insulation cavity of a given thickness, optimization of the number of layers (N) represents a balance between radiative losses (which dominate if N is too small), and conduction losses (which dominate if N is too large). Accordingly, in a roughly optimized MLI vessel, conduction and radiation losses are comparable. Thus, the following:

$$Q_{(LH2)} = Q_{C(LH2)} + Q_{R(LH2)}; \text{ and}$$

$$Q_{C(LH2)} = Q_{R(LH2)}.$$

Assuming the thermal conductivity and emissivity of the MLI composite structure is not a strong function of temperature, the ratio of $Q_C$ for molten $NaNO_2$ and LH2 to must be of order:

$$\frac{Q_{C(NaNO_2)}}{Q_{C(LN_2)}} = \frac{T_{NaNO_2} - T_{amb}}{T_{amb} - T_{LH_2}},$$

and the ratio of $Q_R$ for molten $NaNO_2$ and LH2 must be of order:

$$\frac{Q_{R(NaNO_2)}}{Q_{R(LN_2)}} = \frac{T_{NaNO_2}^4 - T_{amb}^4}{T_{amb}^4 - T_{LH_2}^4}.$$

The above implies:

$$Q_{NaNO_2} = Q_{C(LN_2)} \left[ \frac{Q_{C(NaNO_2)}}{Q_{C(LN_2)}} \right] + Q_{R(LN_2)} \left[ \frac{Q_{R(NaNO_2)}}{Q_{C(LN_2)}} \right] =$$

$$\frac{Q_{LH_2}}{2} \left[ \frac{Q_{C(NaNO_2)}}{Q_{C(LN_2)}} + \frac{Q_{R(NaNO_2)}}{Q_{C(LN_2)}} \right]$$

$$Q_{NaNO_2} = \frac{Q_{LH_2}}{2} \left[ \frac{T_{NaNO_2} - T_{amb}}{T_{amb} - T_{LH_2}} + \frac{T_{NaNO_2}^4 - T_{amb}^4}{T_{amb}^4 - T_{LH_2}^4} \right]$$

$$Q_{NaNO_2} = \frac{Q_{LH_2}}{2} \left[ \frac{573 \text{ K} - 298 \text{ K}}{298 \text{ K} - 20 \text{ K}} + \frac{(573 \text{ K})^4 - (298 \text{ K})^4}{(298 \text{ K})^4 - (20 \text{ K})^4} \right]$$

$$Q_{NaNO_2} = \frac{Q_{LH_2}}{2}[0.99 + 12.7] = 6.8 \; Q_{LH_2} = 5.5 \text{ to } 11 \text{ GJ day}^{-1}.$$

In reality, the thermal leakage would likely be considerably less than this because $$Q_{R(NaNO2)} \approx 13 Q_{C(NaNO2)}$$

indicates that the optimum MLI layer density for storage of liquid hydrogen is considerably different than that for storage of a 300 C fluid. Further, it is unlikely that each shipment of molten $NaNO_2$ would be exposed to ambient temperature for a full 24 hours. Nonetheless, for the purposes of these calculations, the more pessimistic of the above heat loss figures can be used and doubled to account for heat loss for molten sodium metal transported in the opposite direction. The resultant figure amounts to roughly 20 GJ day$^{-1}$. For comparison, the amount of energy stored in the daily shipment of $NaNO_2$ was earlier calculated to be 21.8 GW hr$^{-1}$, which corresponds to 78,500 GJ. It can thus be safely concluded that using a properly insulated tank car, the energy efficiency penalty for heat loss during transport would be negligible. The same argument applies to super-insulated containers formatted for trucks, intermodal shipping containers, barges, etc., as well as the large tanks used as reservoirs of molten Na and molten $NaNO_2$. Battery modules formatted for tractor-trailers or shipping containers can be used to provide highly agile interim deployment capability. This allows the optimal geographic distribution of grid storage resources to naturally evolve over time to meet changing customer needs.

Although the above calculations are somewhat rough, they are of interest because of existing rail freight corridors that pass through numerous strategically important remote locations. For instance, the rural/desert southwest is well-suited to siting utility scale solar installations. In addition to the specialized application of connecting remotely sited solar, wind, etc. installations to population centers and existing backbones of the electrical grid, such a rolling pipeline transmission model can also be used more generally as an alternative to constructing new high capacity electrical transmission lines. For example, a cost-effective and easily deployed grid storage technology can be used to ensure that an existing transmission line is always operated at 100% of its rated current carrying capacity (despite local and regional variations in electricity demand). Grid storage can also be used to eliminate load spikes, thereby extending the lifetime of aging components such as transformers, and allowing some equipment upgrades to be deferred. These benefits of grid storage are in addition to that of eliminating solar and wind over-production scenarios in which power generation capacity is sometimes "thrown away" because it cannot be absorbed by the grid.

In summary then, technologies relating to the radical-ion battery 100 may be capable of addressing both grid storage and transmission problems that hamper large-scale adoption of intermittent renewables. Additionally, the radical-ion battery 100 can be employed in electric vehicles. The reduction of use of fossil fuels in the transportation sector is desirable. This requires that renewable energy supersede fossil fuels for electricity production, and that cost-effective batteries are developed for electric vehicles that can be manufactured on a massive scale. Current generation electric vehicles rely primarily on lithium-ion battery technology, which results in a very heavy and very expensive vehicle power plant with limited range. For example, a conventional electric car which receives an EPA rated driving range of 265 miles with an 85 kW per hour lithium-ion battery is considered. The battery pack weighs 1200 pounds and accounts for 21 to 22% of the total vehicle cost. Concerns have also been repeatedly raised about limited supply of materials, initially about lithium, but also with respect to cobalt and nickel. The radical-ion battery 100 described above can mitigate such problems. Theoretical energy densities of 1.18 kW-hr kg$^{-1}$ and 1.45 kW-hr liter$^{-1}$ were previously calculated for the $NaNO_2$ version of the radical-ion battery 100. An 85 kWh battery would require a total reaction mass of:

$$m=(85.0 \text{ kW-hr})/(1.18 \text{ kW-hr kg}^{-1})=72.0 \text{ kg}=159 \text{ lb.},$$

occupying a reactant volume of:

$$V=(85.0 \text{ kW-hr})/(1.45 \text{ kW-hr liter}^{-1})=58.6 \text{ liters}=15.5 \text{ gallons}.$$

While it is to be remembered that these numbers omit the balance of plant for the radical-ion battery 100, which at minimum would also include reactant vessels, electrodes, ion-selective membranes, thermal insulation, and thermal management subsystems, the above numbers are encouraging (especially in view of the low cost and effectively unlimited abundance of sodium nitrogen and oxygen).

There are two issues that are to be evaluated for light duty vehicle applications. The first is thermal management. A battery that must be kept at approximately 300 C at all times is not a major burden in applications such as stationary power generation, because the batteries in question are large in size and constantly in use. But the relatively high surface-area-to-volume ratio of an 85 kW-hr battery makes the energy penalty associated with thermal leakage to the environment a potential disqualification.

For example, sodium polysulfide batteries were originally developed by the FORD MOTOR COMPANY in the 1960s for potential use in light-duty electric vehicles. Sodium polysulfide was also subsequently evaluated for grid storage as well, but the highly corrosive nature of sodium polysulfide has proven to be a very difficult obstacle. Nonetheless, the results of such studies are helpful from the standpoint of evaluating thermal management challenges because the sodium polysulfide battery must be maintained at a temperature of 350 C. The same is true of many of the original sodium sulfur battery's descendants, such as the ZEBRA battery, which is based on a Na/NiCl$_2$ redox system. On the basis of work conducted on Na/NiCl$_2$ batteries for electric vehicle applications, 14% can be taken as a preliminary estimate of the efficiency penalty that would be incurred in the application of a $NaNO_2$ radical-ion battery in a light-duty electric vehicle application. As discussed below, a $LiNO_2$ instantiation of the radical-ion battery can be used to bring the operating temperatures down to approximately 225 C, which would likely reduce the efficiency penalty to approximately 10%, where the use of lithium is acceptable from a material supply chain standpoint because cobalt and nickel would not be required. Thermal efficiency penalties would be expected to be far smaller for transportation applications involving much larger motors, such as railroad locomotives, buses, trucks, and ships.

Vehicle safety must also be considered. In conventional vehicles, it is recognized that a 10-gallon tank of gasoline represents a non-negligible safety risk, and that the presence of extremely flammable liquid contributes in some measure to injuries and fatalities resulting from automobile accidents. An issue to be addressed is whether the engineered safety systems required to render a system such as an $NaNO_2$ battery comparably safe would be economically viable.

Alternative chemistries, chemical additives, and further compositional variants are now set forth. $NO_2^-/NO_2$ is a promising radical-ion candidate for interacting with the anionic electrode of the radical-ion battery 100. There are, however, a number of options for the cationic electrode. In principle, any cation whose neutral species comprises a free radical and that forms an ionic nitrite salt which is stable above its melting point may be among those considered. An example is the $Li/LiNO_2/NO_2$ system which offers a comparable cell voltage to $Na/NaNO_2/NO_2$, but features lower operating temperature, fewer safety concerns for applications such as electric vehicles, and higher gravimetric power density.

Using tabulated thermodynamic data for this standard free energy of formation for each of the reagents:

$\Delta G_f^\circ(Li)=0$ kJ $mol^{-1}$ $\Delta G_f^\circ(NO_2)=+51.9$ kJ mol-1

$\Delta G_f^\circ(LiNO_2)=-302$ kJ $mol^{-1}$, the change in free energy for the $Li+NO_2 \rightarrow LiNO_2$ reaction under the standard state conditions can be calculated to be:

$\Delta G^\circ = -353.9$ kJ $mol^{-1}$, from which a standard state electrochemical potential can be calculated:

$$E^\circ = \frac{\Delta G_f^\circ}{nF} = \frac{353900 \text{ J mol}^{-1}}{96485 \text{ C mol}^{-1}} = 3.67 \text{ V}.$$

This is 5% higher than the $E^\circ$ for the $Na/NaNO_2/NO_2$ system (3.49 V). The melting point of $LiNO_2$ is 222 C, and the melting point of lithium metal is 181 C. Accordingly, such a battery can be operated at temperatures as low as ~225 C. Use of such a battery is partly contingent on finding appropriate $Li^+$ ion-selective membrane material.

In the case of potassium, using tabulated thermodynamic data for the standard free energy of formation for each of the reagents:

$G_f^\circ(K)=0$ kJ $mol^{-1}$ $\Delta G_f^\circ(NO_2)=+51.9$ kJ mol-1

$\Delta G_f^\circ(KNO_2)=-335$ kJ $mol^{-1}$, the change in free energy for the $K+NO_2 \rightarrow KNO_2$ reaction under standard state conditions can be calculated to be:

$\Delta G^\circ = -353.9$ kJ $mol^{-1}$, from which a standard state electrochemical potential can be calculated:

$$E^\circ = \frac{\Delta G_f^\circ}{nF} = \frac{386900 \text{ J mol}^{-1}}{96485 \text{ C mol}^{-1}} = 4.01 \text{ V}.$$

This is 15% higher than the $E^\circ$ for the $Na/NaNO_2/NO_2$ system (3.49V). High performance potassium-ion-selective membranes based on beta-alumina are commercially available. An obstacle to direct exploitation of a $K/KNO_2/NO_2$ system is that heating $KNO_2$ to its melting point (438 C) results in gradual thermal decomposition starting at approximately 410 C. In absolute terms, the melting point of $KNO_2$ is inconveniently high. A potential solution to these issues is discussed below.

Other nitrites that are known to exist include Rb, Cs, Ca, Sr, Ba, La, Ni, Ag, Hg, Tl, Pb, Pr, Nd, Sm, Tb, Dy, and Yb. There are also elements for which the existence of stable nitrites is suspected but uncertain (Co, Pd, Cu, Cd). Some of the nitrite species having less electropositive cations are thought to be covalent rather than ionic. The elements that are known not to form nitrite compounds (most of the transmission metals, for example) are also of interest from the standpoint of selecting electrode materials that will not be subject to corrosion. Within this group of non-nitrite forming elements, of particular interest are those that do not form an electrically insulating oxide layer in the presence of molten nitrite salt, or catalyze thermal decomposition of the $NO_2$ or $NO_2^-$.

Among the various elements other than Li, Na, and K known to form nitrites, many are immediately disqualified from practical applications due to cost or toxicity. In addition, many of these nitrite compounds undergo thermal decomposition prior to melting, as was noted earlier for potassium. For example, calcium nitrite is potentially interesting from the standpoint of low-cost and low toxicity. Further, even though elemental Ca does not actually have an odd number of electrons as is the case with alkali metals, it is still very chemically reactive. It can therefore be expected that a low over-voltage at a $Ca/Ca^{2+}$ cationic electrode would be observed. Calcium metal's chemical reactivity is on par with lithium, in accordance with a diagonal rule of the periodic table, and might therefore be of interest for electric vehicle applications. But the onset thermal decomposition to $N_2O$ (g) is observed at 220 C, while the melting point of $Ca(NO_2)_2$ is 390 C.

In the case of $KNO_2$, it may be possible to address the thermal decomposition problem by blending $KNO_2$ with other species that affect freezing point depression. Such additional species may exhibit no electrochemical reactivity, may or may not have cations and/or anions in common with electrochemically active species, and/or may comprise nitrite salts that may be electrochemically active or inactive.

In the case of $KNO_2$, various binary, ternary, quaternary, quinary, etc. salt mixtures are contemplated to affect lower temperature operations so as to achieve the higher operating voltage provided by the $K/KNO_2/NO_2$ system while avoiding thermal decomposition of $KNO_2$, or for the purpose of using $KNO_2$ as a freezing point depressant or both. For example, $NaNO_2$ and $KNO_2$ form a binary eutectic with a melting point of approximately 225 C, as well as a wide range of $NaNO_2/KNO_2$ mole fraction mixtures with melting points well below the thermal decomposition temperatures of both $KNO_2$ and $NaNO_2$. In an exemplary embodiment, $KNO_2$ is used simply to depress the freezing point of the majority $NaNO_2$ electrolyte from 271 C to less than 250 C. This can be done for the purpose of allowing Kalrez fluoroelastomer O-rings having a maximum continuous service temperature of 260 C to be used. As $NaNO_2$ is added/withdrawn to/from the electrolyte 212 during charging and discharging, the freezing point of the electrolyte 212 may vary between 225 C to 250 C as the mole fraction of $NaNO_2$ is varied over the approximate range of 50 to 80%. Alternatively, a K-ion-selective electrode can be used and only the $K/KNO_2/NO_2$ redox cycle can be operated (between 20 and 50% mole fraction of $KNO_2$).

In another embodiment, $NaNO_2$ can be replenished during the charging process to keep the melting point of the electrolyte 212 constant (e.g., to hold the electrolyte 212 at the eutectic mole fraction having a melting point of approximately 225 C). Such a strategy can be useful for a facility that is used to convert $NaNO_2$ to Na and $NO_2$ using renewable energy at a remote location, wherein the Na/NO$_2$ reagents are shipped by rail to be converted into electrical power elsewhere.

To generate a battery based on the 65/35 KNO$_2$/NaNO$_2$ eutectic having a melting point of 225 C that would maintain the correct mole fraction of NaNO$_2$/KNO$_2$ during both charging and discharging, two separate ion-selective cationic electrodes for Na and K (electrically in parallel) can be included in the electrochemical cell 108, in conjunction with control circuitry that restricts the Na and K charging/discharging currents to a predetermined ratio (e.g., by operating only one electrode at a time and varying the duty cycle between the two electrodes). Such a cell design can allow operation at 230 C, such that silicone O-rings, gaskets, etc. may be used. The molten Na and K metal collected can either be kept separately or allowed to mix to form a Na/K alloy.

Analogous cell designs having electrolyte temperatures as low as ~150 C are also contemplated. The melting point of lithium metal is 181 C, however, which would set the minimum electrolyte temperature if LiNO$_2$ is to be an electrochemically active constituent of such a cell. On the other hand, it is clear that LiNO$_2$ can play a role as an electrolyte freezing point depression additive in a Na/NaNO$_2$/NO$_2$ cell.

Additionally, Ca(NO$_2$)$_2$ may have utility as a freezing point depressant as well. Both the NaNO$_2$/Ca(NO$_2$)$_2$ and KNO$_2$/Ca(NO$_2$)$_2$ binary eutectics have melting points in the vicinity of 200 C. More generally, through the use of ternary and higher salt mixtures, melting points may be manipulated further, albeit at the expense of increased complexity. Ternary mixtures of LiNO$_2$/NaNO$_2$/KNO$_2$ are also contemplated.

The LiNO$_2$/KNO$_2$ binary salt system can also be utilized in the radical-ion battery 100. Although Li and K metal do not appear to form a binary alloy in any known stoichiometry, the LiNO$_2$/KNO$_2$ binary salt system is remarkable in its ability to form low-melting mixtures. For example, the LiNO$_2$/KNO$_2$ binary eutectic has a melting point of 98 C. Therefore, K/KNO$_2$/NO$_2$ can be the electrochemically active constituent in the radical-ion battery 100, and LiNO$_2$ can be used as a freezing point depressant, wherein the chemical composition of the mixed electrolyte may vary over some range suitably close to the eutectic mole fraction.

For example, the melting point of the LiNO$_2$/KNO$_2$ binary salt system is restricted to the range 98 C≤T≤150 C if the mole fraction of KNO$_2$ (X) is kept between a lower limit of $X_{min}$=30% and an upper limit of $X_{max}$=50%. In the fully discharged state (X=$X_{max}$), the mass of the electrolyte 212 is at a maximum, and the mass fraction (F) of the electrolyte that comprises KNO$_2$ is given by:

$$F = \frac{M_{KNO_2} X_{max}}{M_{LiNO_2}(1 - X_{max}) + M_{KNO_2} X_{max}} =$$

$$\frac{(85.10 \text{ gm mol}^{-1})(0.50)}{(52.95 \text{ gm mol}^{-1})(0.50) + (85.10 \text{ gm mol}^{-1})(0.50)} = 61\%$$

The fraction of the electrochemically active reagent (KNO$_2$) that is available for use (f) is given by:

$$f = \frac{X_{max} - X_{min}}{X_{max}(1 - X_{min})} = \frac{0.50 - 0.30}{0.50(1 - 0.30)} = 57\%.$$

Thus, the mass fraction of the electrolyte as a whole that is electrochemically active is:

$$Ff = \frac{M_{KNO_2}(X_{max} - X_{min})}{(1 - X_{min})[M_{LiNO_2}(1 - X_{max}) + M_{KNO_2} X_{max}]} = 35\%.$$

The gravimetric energy density of the electrolyte is only 35% of a theoretical all-KNO$_2$ radical-ion battery, because 65% of the electrolyte is dead weight from an electrochemical standpoint.

It was previously calculated that the mass of the electrolyte for an 85 kW-hr light-duty electric vehicle battery is 72 kg for a Na/NaNO$_2$/NO$_2$ radical-ion battery. If a 65% dead-weight penalty is applied to the electrolyte of such a battery a mass penalty of 134 kg is incurred. Considering that the existing 85-kW-hr Li-ion battery used in a conventional electric car weighs 540 kg, and that a typical sedan might weigh 1500 kg, incurring a 134 kg weight penalty to allow operation at a temperature of 150 C is feasible. Moreover, it is likely that a ternary or quaternary salt mixture using NaNO$_2$ and/or Ca(NO$_2$)$_2$ additives can expand the KNO$_2$ mole fraction range over which low temperature operation can be realized, therefore reducing the weight penalty relative to that calculated above.

As indicated previously, a light-duty vehicle can include a Li/LiNO$_2$/NO$_2$ radical-ion battery operating just above the melting point of LiNO$_2$ (222 C). Alternatively, a light-duty vehicle can include a simple Na/NaNO$_2$/NO$_2$ radical-ion battery operating just above the melting point of NaNO$_2$ (271 C). The chemistries employed depend in part on available materials/techniques for reliable seals and low-loss thermal insulation. In addition, many ion-selective membrane materials exhibit higher resistivity at lower temperatures, such that resistive losses may curtail prospects for reduced operating temperature.

In further embodiments, one or more electrolyte additives directed towards increasing the solubility of NO$_2$ in the electrolyte 212 may be employed, and/or one or more electrolyte additives may be included to suppress unwanted side reactions such as NO$_2^-$+NO$_2$→NO$_3^-$+NO discussed earlier (either by lowering the operating temperature of the electrolyte 212, chemically inhibiting the forward reaction, accelerating the reverse reaction, or some combination thereof). In addition to the use of additives in the molten electrolyte 212, use of additives to lower the melting point and/or improve the wetting behavior of the various molten metal species in question is also contemplated. For example, LiNO$_2$/NaNO$_2$ can allow electrolyte temperatures as low ~150 C, but the melting point of lithium metal is 181 C. Alloying lithium metal with calcium metal can be undertaken to alleviate this difficulty. In such an embodiment, the calcium metal serves as a freezing point depressant, and is sequestered from the chamber 202 by the separator 206. The 92/8 mole fraction Li/Ca alloy forms a eutectic that melts at only 141 C, but the melting point is relatively sensitive to composition. Accordingly, using a ternary electrolyte such as LiNO$_2$/NaNO$_2$/Ca(NO$_2$)$_2$ is contemplated, in which the Li and Ca are maintained at a 92/8 mole fraction ratio on both sides of the separator 206, wherein separate lithium and calcium ion-selective electrodes deliver Li and Ca ions to a common molten Li/Ca metal alloy reservoir.

One type of electrolyte additive that deserves attention is the nitrate ion. Sodium nitrate, for example, can be considered. Electrolysis of molten sodium nitrate occurs at a higher voltage than electrolysis of molten sodium nitrite:

$$NaNO_3 \rightarrow Na + NO_2 + 1/2\, O_2$$

$$\Delta G_f^\circ(Na) = 0 \text{ kJ mol}^{-1}$$

$$\Delta G_f^\circ(NO_2) = +51.9 \text{ kJ mol}-1$$

$$\Delta G_f^\circ(O_2) = 0 \text{ kJ mol}^{-1}$$

$$\Delta G_f^\circ(NaNO_3) = -365.9 \text{ kJ/mol}$$

$$\Delta G^\circ = -417.2 \text{ kJ mol}^{-1}$$

$$E^\circ = \frac{\Delta G_f^\circ}{nF} = \frac{417200 \text{ J mol}^{-1}}{96485 \text{ C mol}^{-1}} = 4.32 \text{ V}$$

This is 830 mV greater than $E^\circ$ for $NaNO_2$, which implies that there should be a "voltage window" within which nitrite ions are electrochemically active and nitrate ions are not. One of the reasons that this is potentially important is that there are numerous documented nitrite/nitrate salt mixtures exhibiting strong freezing point depression effects that may be well-suited for the radical-ion battery 100. In addition, the presence of nitrate ions may be of interest from the standpoint of enhancing the solubility of $NO_2$ in the electrolyte. In part this has to do with the solubility of $NO_2$ in molten nitrate salts in accordance with the "like dissolves like" solubility rule. But in addition, a mixture of $NO_2^-$ and $NO_3^-$ ions presents numerous geometric permutations for formation of a solvent sphere around $NO_2$ molecules. This may result in a synergistic solubility enhancement effect. Finally, the presence of substantial quantities of nitrate ions can facilitate pushing the equilibrium $NO_2^- + NO_2 \rightarrow NO_3^- + NO$ reaction to the left.

In further embodiments, the nitrate ion may be used as the electrochemically active constituent, in addition to, or rather than nitrite. In one all-nitrate embodiment, for example, the electrolyte 212 comprises substantially pure $NaNO_3$, and $NO_3^-$ ions are oxidized at the anionic electrode. This process may occur via the electrode reaction:

$$NO_3^- \rightarrow NO_3(g) + e^-,$$

followed by thermal dissociation of $NO_3$ (g):

$$2NO_3(g) \rightarrow 2NO_2(g) + O_2(g)$$

via a number of possible mechanisms involving NO or $NO_2$, such as:

$$2NO_3(g) \rightarrow 2NO(g) + 2O_2(g)$$

$$2NO(g) + 2O_2(g) \rightarrow 2NO_2(g) + O_2(g);$$

or:

$$2[NO_3(g) \rightarrow NO_2(g) + 2O(g)]$$

$$O(g) + O(g) \rightarrow O_2(g).$$

Alternatively, $NO_3$ fragmentation may occur during the electrochemical oxidation step via:

$$NO_3^- \rightarrow NO_2(g) + O(g) + e^-;$$

or:

$$NO_3^- \rightarrow NO(g) + O_2(g) + e^-.$$

It may then prove possible to operate a discharging process, wherein $NO_2$ (g) and $O_2$ (g) are bubbled into (or otherwise delivered to) the electrolyte 212 to run the above reaction in the backward direction. For example, this process could occur via the electrode reaction:

$$NO_2(g) + e^- \rightarrow NO_2^-,$$

followed by oxidation of $NO_2^-$ to $NO_3^-$ by the $O_2$ (g) present. Although sodium nitrate has been used to illustrate the above example, it will be understood that any appropriate nitrate salt may be employed in a similar manner.

Moving on to aspects of cell construction, in an example, physical contact between the molten metal and its respective ion-selective electrode is maintained by hydrostatic pressure (e.g., a column of molten sodium contained in a vertically oriented sodium-beta-alumina tube that is closed at the bottom, as shown in FIG. 2). Additionally or alternatively, additives can be used to improve wetting of the ion-selective electrode surface by the molten metal. For example, small quantities of cesium metal added to molten sodium have been shown to improve wetting of sodium-beta-alumina at low temperatures. Still further, physical and electrical contact of the molten metal with the ion-selective electrode surface may be facilitated by the use of a sponge-like material such as, but not limited to, metal wool, carbon felt, glass wool, and the like. Moreover, the molten-metal side of the ion-selective electrode can be partially coated with a material that improves the wetting of molten metal but does not cover the surface of the ion-selective electrode entirely. For example, sputtering or evaporation can be used to deposit a fraction of a monolayer of material having high affinity for wetting of the molten metal in question.

Finally, it will be understood that there is a wide range of materials that can be used for ion-selective electrodes. For example, nano-porous films including engineered structures fabricated by multistage "stack-and-draw" techniques may be used. Mechanical reinforcement of brittle ion-selective membrane materials, such as ceramics and glass, may be affected by deposition of thin layers of such materials on porous (e.g., sintered) support structures or via incorporation of reinforcing fibers, wire, mesh, etc. on the surface and/or interior of such membrane materials. Two or more redundant membranes in series may also be used to lower the probability of a membrane breach. In one such embodiment, a plurality membrane layers which are made thin enough that individual layers exhibit a high degree of mechanical flexibility (and therefore resistance to breakage) are partially sintered together to create a structure that resists crack propagation in the direction normal to the surface of the membrane. In a related embodiment, rather than being sintered, adjacent layers are bonded together with a thin layer of material that permits passage of the desired cation (e.g., Na+), such as a metal that is liquid at the operating temperature of the cell, and that exhibits good wetting and adhesion to the membrane material.

Connecting cells will now be discussed. In many applications it is desirable to operate large number of cells in series to minimize the overall resistive losses of a system as a whole, enable use of smaller gauge wire for routing of electrical power, minimize diode forward voltage drop efficiency penalties associated with some types of DC-DC converter and inverter architectures, etc. For example, in one variant of the battery pack used in a conventional electric vehicle, a total of 6912 lithium ion cells are configured as 16 modules placed electrically in series. The module voltage is 21.6 V, resulting in a bus voltage on the order of 350 V. Each 21.6 V module in turn contains 432 lithium ion cells comprising 72 submodules wired in parallel, wherein each submodule comprises six lithium-ion cells in series. Likewise, in the case of solar photovoltaic systems, each photovoltaic cell has an output voltage on the order of 0.6 V, but the typical DC bus voltage for a photovoltaic installation as a whole may be 600 V.

Figure 7:
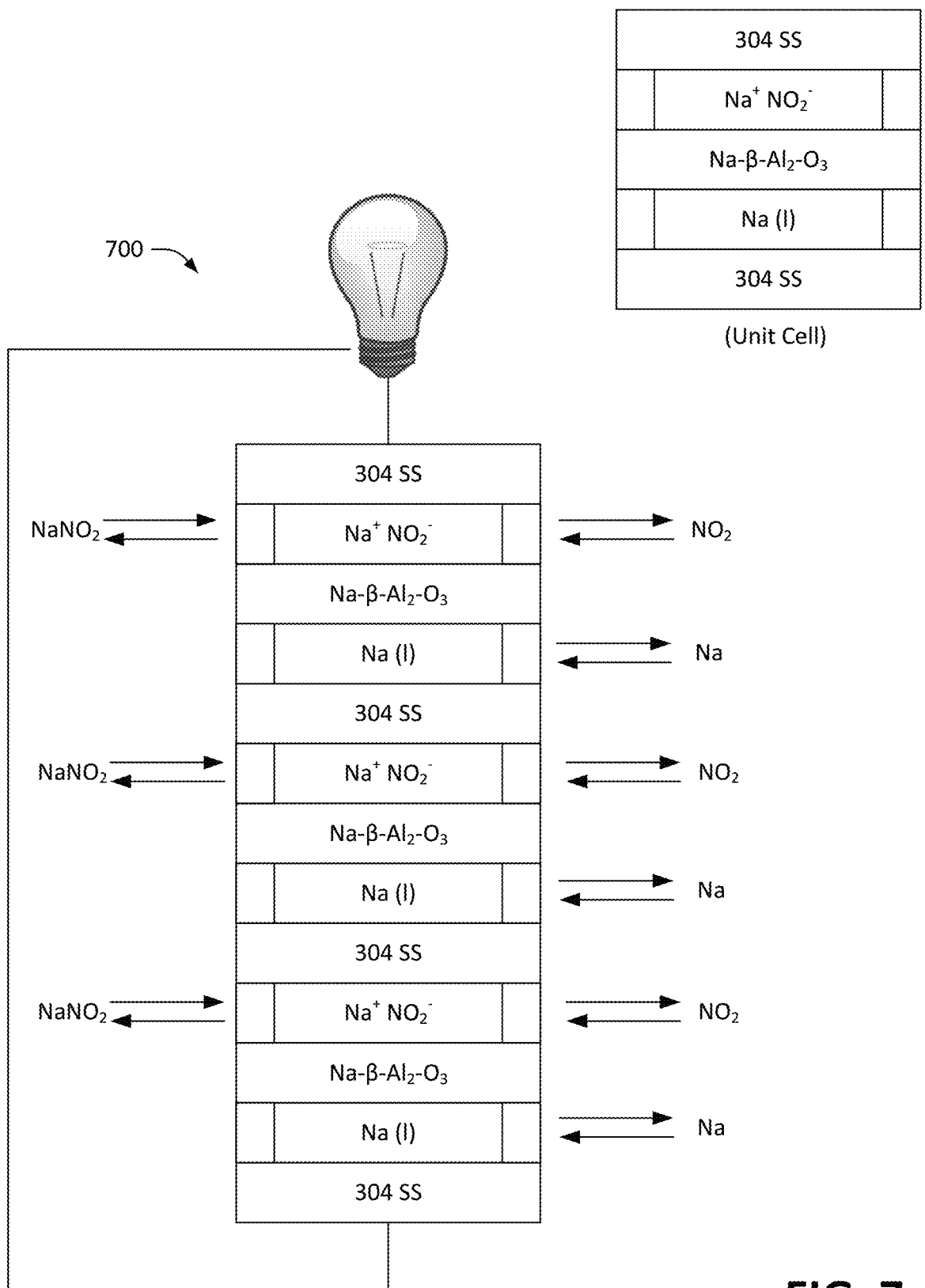
FIG. 7 is a schematic diagram of a series-connected radical-ion battery stack.

A battery technology, such as that described herein, can be adapted to the construction of compact series connected multi-cell modules whose internal series connections add negligible electrical resistance. FIG. 7 illustrates a series connected stack 700 in schematic form. In the example shown in FIG. 7, the electrolyte 212 is $NaNO_2$, the ion selective membrane (separator 206) is Na-β-$Al_2O_3$, the cationic electrode is sodium metal, and the anionic electrode is 304 stainless steel. It is to be understood that this presented example is but one of many different materials combinations that can be used for the separator 206 and/or electrodes. Seals can comprise O-rings, elastomer gasket, etc. It can be noted that the 304 stainless steel electrode serves not only as the anionic electrode, but also forms part of the molten sodium metal containment vessel and functions as a low resistance electrical connection between successive cell units.

Figure 8:
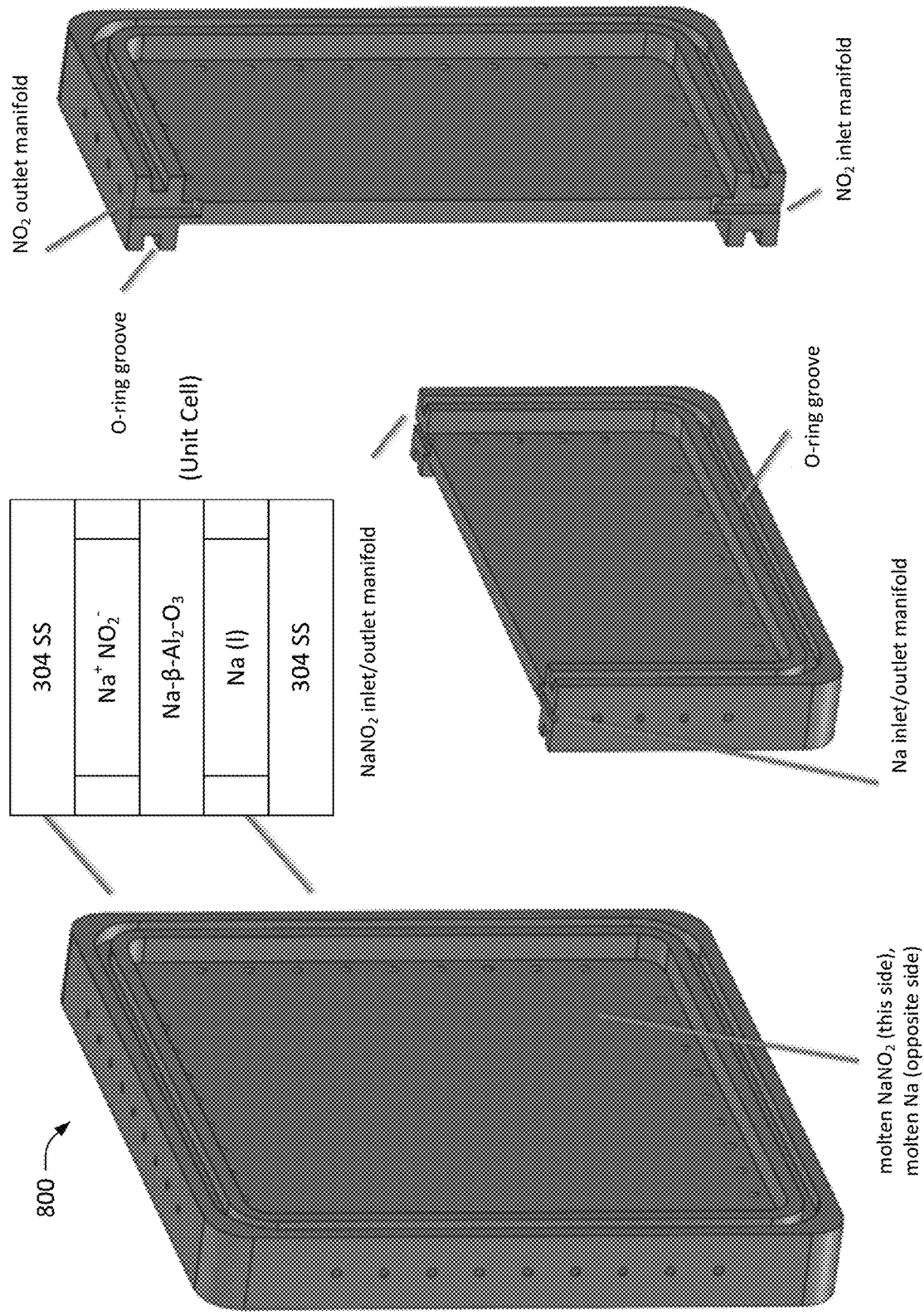
FIG. 8 is a schematic that depicts an exemplary configuration of a unit cell of a series-connected radical-ion battery stack.

Referring to FIG. 8, an exemplary construction of a series connected stack 800 is depicted. The stack 800 is constructed in a manner that all mechanical design features required to accommodate seals, inlet/outlet manifolds, and $NO_2$ (g) spargers (not shown), etc., can be incorporated into the 304 SS plates. Such a design is directed towards making the separator 206 assume the form of featureless ceramic plates requiring no machining or other post processing steps. When assembled, the stack 800 can be configured such that sealing at the electrode/O-rings/ceramic interface occurs without any form of electrical contact between the electrode and the separator 206 (e.g., O-rings not fully compressed). Such an arrangement also allows for thermal expansion/contraction in the axial direction without subjecting the separator 206 to excessive mechanical stress.

Seals may also comprise one or more type of alkalai borosilcate glass such as that used for porcelain vitreous enamel. Said seals may include adhesion promoters that include oxides of Co, Fe, Ni, Cu, Mn, adapted to establishing oxygen bridging chemical bonds to one or more steel or stainless steel components. Said alkali borosilicate glass may further comprise additives directed to adjust the strain relief temperature of said glass composition to at or near the operating temperature of the electrochemical cell.

The active portion of the 304 SS anionic electrode may be porous, textured, or otherwise adapted to provide a maximum available surface area. The active portion of the 304 SS anionic electrode may further comprise a structure that functions as both the electrode and a sparger for $NO_2$ gas (e.g., a sintered 304 stainless steel plate with an internal cavity that functions as the gas manifold for $NO_2$ gas distribution). Portions of such electrode may be coated with a thin layer of catalytic active material or otherwise chemically treated to improve electrode reaction kinetics. The physical orientation of the stack 800 may be chosen so that $NO_2$ gas is introduced at the bottom of the electrolyte compartment and/or withdrawn at the top of the electrolyte compartment, so as to prevent formation of trapped gas bubbles. Manifolds for reagent introduction withdrawal are depicted as a plurality of simple holes in FIG. 8, but it will be understood that additional features adapted to the routing of reagents between unit cells and multiple series stacks may be included as well.

Figure 9:
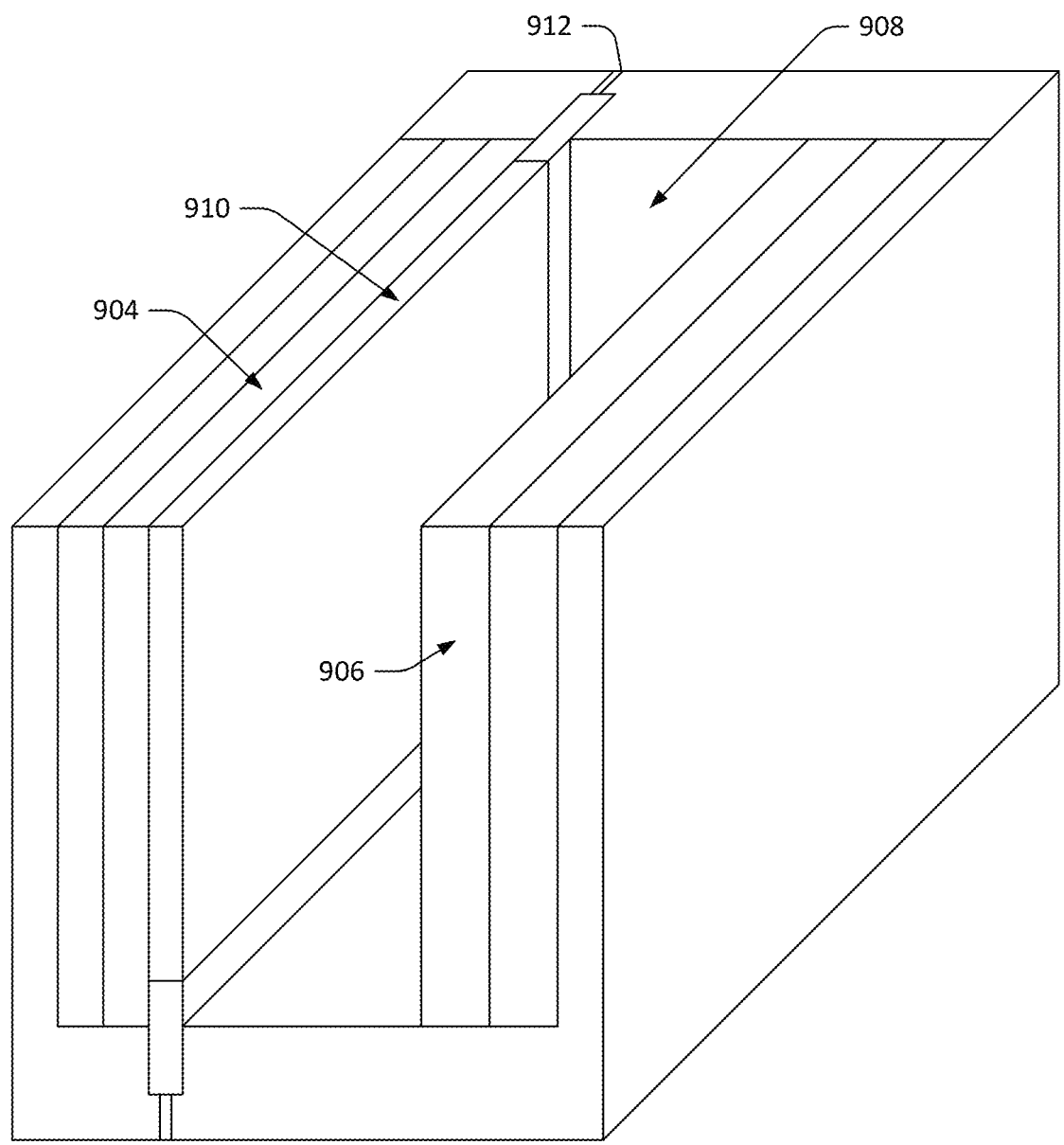
FIG. 9 illustrates an exemplary planar electrochemical cell that is well-suited for use in a radical-ion battery.
Figure 10:
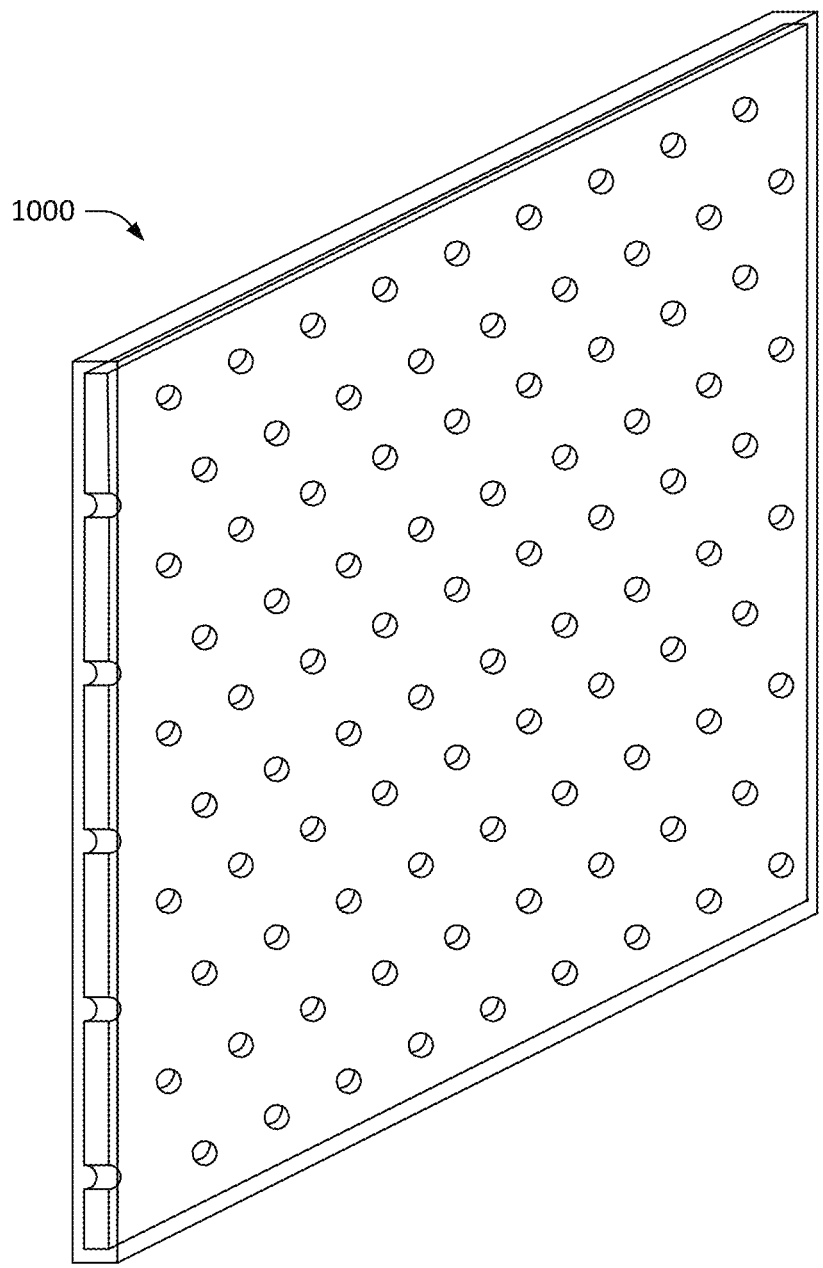
FIG. 10 depicts an exemplary separator that can be included in a planar electrochemical cell.

Now referring to FIG. 9, a cutaway view of an exemplary electrochemical cell 900, with a planar profile, is depicted. The electrochemical cell 900 has a stainless steel housing 902 and sintered stainless steel plates 904 and 906, wherein the plates 904 and 906 define a chamber 908 within which an electrolyte (e.g., $NaNO_2$) is retained. The electrochemical cell 900 further includes a separator 910, which can be formed of Na-β-$Al_2O_3$ and α-$Al_2O_3$, where α-$Al_2O_3$ is used at the perimeter of the separator 910, and conducts neither ions nor electrons. The electrochemical cell 900 further includes a glass or ceramic seal 912, which seals the electrochemical cell 900 at the location of the separator 910. In an alternative embodiment, the separator 910 can be replaced with a separator having a composite structure, wherein the composite structure can comprise an alkalai-metal-doped vitreous enamel and porous metallic substrate. Referring briefly to FIG. 10, an exemplary separator 1000 that can be included in the electrochemical cell 900 is illustrated, wherein the separator 1000 can be based upon a metal and vitreous enamel composite structure. Specifically, the separator 1000 can comprise a perforated steel plate that is coated with an ionically conductive vitreous enamel.

Figure 11:
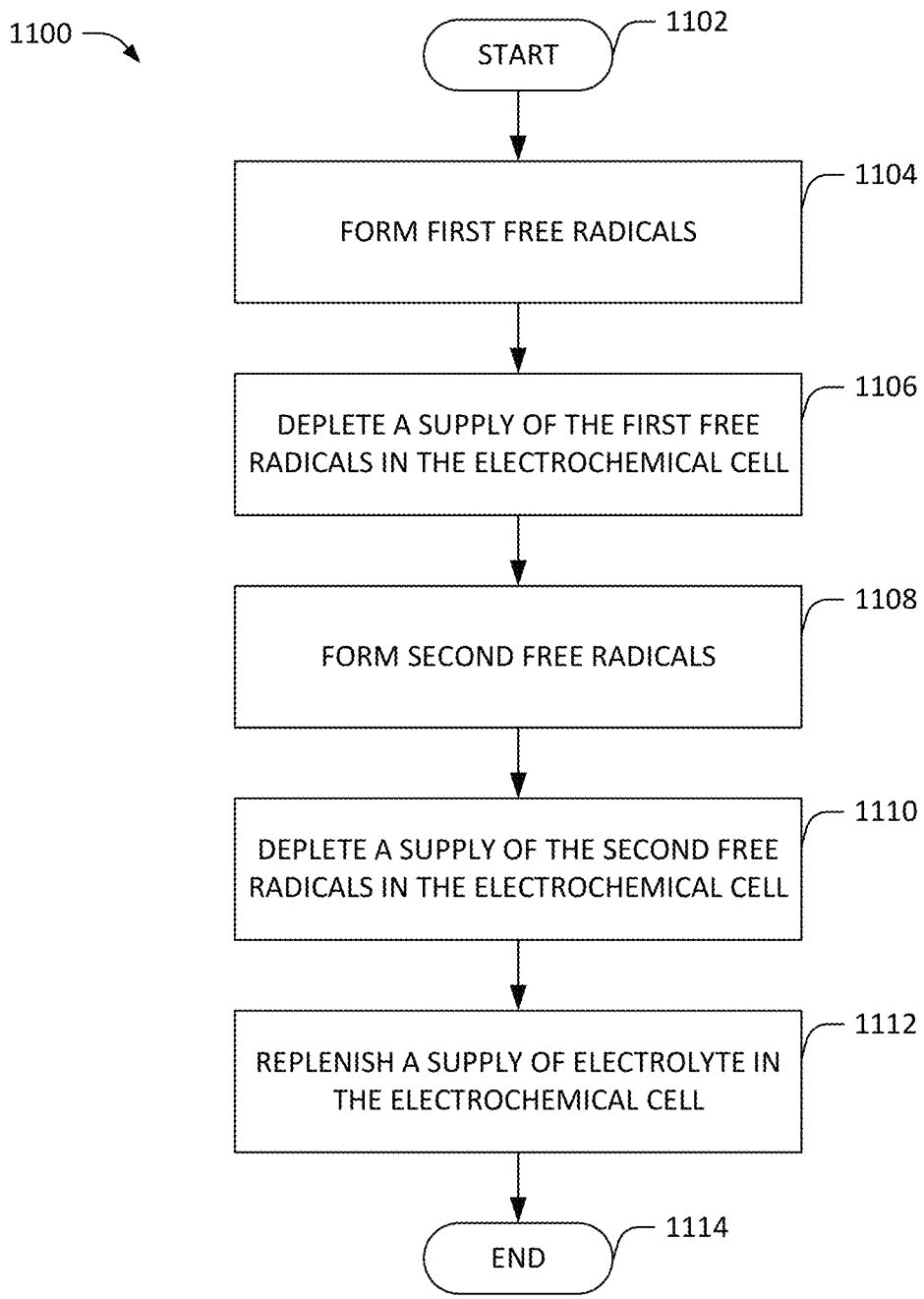
FIG. 11 is a flow diagram illustrating an exemplary methodology for charging a radical-ion battery.
Figure 12:
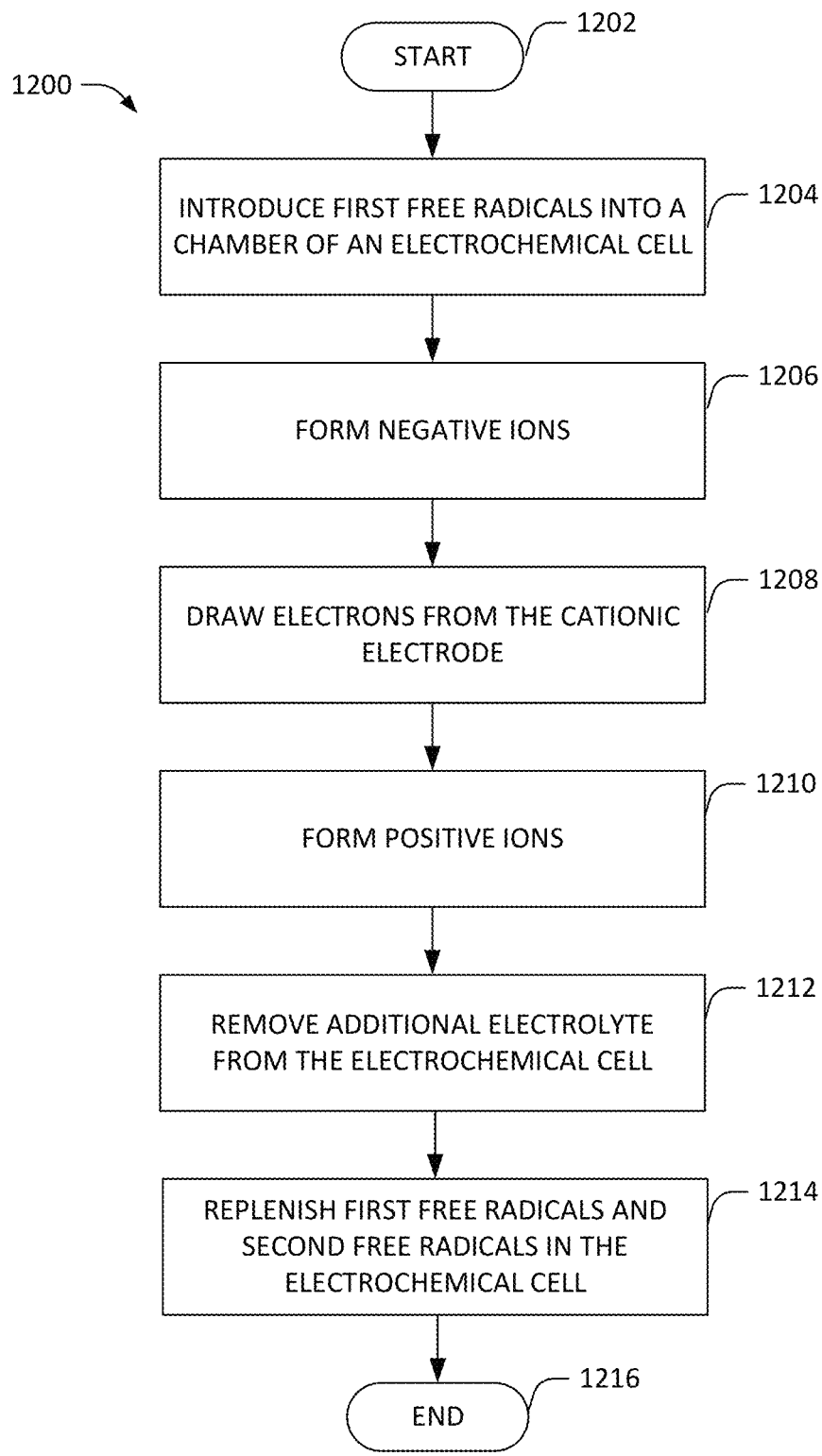
FIG. 12 is a flow diagram that illustrates an exemplary methodology for discharging a radical-ion battery.

FIGS. 11 and 12 illustrate exemplary methodologies relating to operation of a radical-ion battery. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Turning now to FIG. 11, an exemplary methodology 1100 for charging the radical-ion battery 100 is illustrated. When charging, an electric field is applied across the electrolyte 212. The methodology 1100 starts at 1102, and at 1104, negative ions (e.g., $NO_2^-$ ions) in the electrolyte 212 are attracted to the positively charged anionic electrode of the electrochemical cell 108. At the anionic electrode/electrolyte interface, the negative ions donate electrons to the anionic electrode, resulting in formation of first free radicals (e.g., $NO_2$ molecules in gaseous form). For instance, the first free radicals may be in gaseous form, and due to buoyant forces, the first free radicals can bubble upwards to the top of the chamber 202. At 1106, at least some of the first free radicals are caused to exit the electrochemical cell 108 for retention in storage. For instance, pressure can cause the $NO_2$ (g) to exit the electrochemical cell 108 by way of the third fluid conduit 114.

Simultaneous with the act performed at 1104, at 1108, positive ions (e.g., $Na^+$ ions) in the electrolyte 212 are attracted to the negatively charged cationic electrode of the electrochemical cell 108. As noted previously, the separator 206 is configured to allow these ions to pass through, resulting in the positive ions accepting electrons from the cationic electrode at the electrolyte/cationic electrode interface, thereby forming second free radicals (e.g., molten Na). At 1110, at least some of these second free radicals are caused to exit the electrochemical cell for retention in a storage tank that is configured to retain the second free radicals. Accordingly, the volume of the first free radicals and the second free radicals in the electrochemical cell 108 can remain at a steady-state in the electrochemical cell 108.

At 1112, a supply of the electrolyte 212 in the chamber 202 is replenished in the electrochemical cell 108. For instance, some of the electrolyte 212 is used when the first and second free radicals are formed, thereby depleting the electrolyte 212. Additional electrolyte from the second storage container 104 can be pumped into the chamber 202, such that the electrolyte 212 remains at steady volume in the electrochemical cell 108 while the radical-ion battery 100 is charged. The methodology 1100 completes at 1114.

In an exemplary embodiment, the molten electrolyte constituent (e.g. $NaNO_2$) is exchanged between the electrochemical cell and elevated external reservoir using the force of gravity to affect downward flow of molten electrolyte from the reservoir to the electrochemical cell, and hydrostatic pressure generated by the cell discharging reaction ($Na + NO_2 \rightarrow NaNO_2$) to affect upward flow from the electrochemical cell to elevated external reservoir, thereby eliminating the needs for one or more active components such as pumps. In an analogous exemplary embodiment, the molten metal constituent (e.g. Na) is exchanged between the electrochemical cell and elevated external reservoir using the force of gravity to affect downward flow of molten metal from the elevated reservoir to the electrochemical cell, and hydrostatic pressure generated by the cell charging reaction ($NaNO_2 \rightarrow Na + NO_2$) to affect upward flow from the electrochemical cell to elevated external reservoir.

Now referring to FIG. 12, an exemplary methodology 1200 for discharging the radical-ion battery 100 is illustrated. When the radical-ion battery 100 is discharged, an electrical load is applied across the anionic electrode and the cationic electrode of the battery 100. The methodology 1200 starts 1202, and at 1204, first free radicals are introduced into the chamber 202 such that the first free radicals are existent at the electrolyte/anionic electrode interface. For instance, gaseous $NO_2$ can introduced into the chamber 202 by way of the fourth fluid conduit 106 and the sparger 210, where the sparger can form a portion of or be coupled to the conductive housing 208. The first free radicals accept electrons from the anionic electrode, and at 1206, negative ions (e.g., $NO_2^-$ ions) are formed, which are sourced to the electrolyte 212.

At 1208, the load draws electrons from the cationic electrode, wherein second free radicals in the second chamber 204 donate electrons that are directed towards the load. This results in formation of positive ions (e.g., $Na^+$ ions) at 1210, which are sourced to the electrolyte 212 (thereby counterbalancing the negative electrons sourced to the electrolyte 212 from the anionic electrode). The positive ions, as described previously, are able to pass through the separator 206, while the separator 206 prevents the second free radicals from interacting with the electrolyte 212.

These interactions result in formation of additional electrolyte, which, at 1212, can be removed from the chamber 202 of the electrochemical cell 108 by way of the second fluid conduit 112, and directed into the second storage container 104. At 1214, a supply of the first free radicals and the second free radicals is replenished in the electrochemical cell 108 as needed. Again, this can result in a steady volume of the first free radicals, the second free radicals, and the electrolyte 212 existing in the electrochemical cell 108 during discharge of the radical-ion battery 100. The methodology completes at 1216.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A radical-ion battery comprising:
   an electrochemical cell, the electrochemical cell comprises:
   an electrolyte;
   first free radicals in liquid form;
   second free radicals in gaseous form, wherein the first free radicals are different from the second free radicals;
   a first anionic electrode that is configured for use when a charging half-reaction is performed in the electrochemical cell; and
   a second anionic electrode that is configured for use when a discharging half-reaction is performed in the electrochemical cell.

2. The radical-ion battery of claim 1, wherein the electrolyte is molten $NaNO_2$.

3. The radical-ion battery of claim 2, wherein the first free radicals are Na atoms, and wherein the second free radicals are $NO_2$ molecules.

4. The radical-ion battery of claim 1, further comprising a separator that is configured to separate the electrolyte from the first free radicals, wherein the separator is configured to allow a particular type of ion in the electrolyte to pass through the separator.

5. The radical-ion battery of claim 4, wherein the separator is configured to allow $Na^+$ ions to pass therethrough.

6. The radical-ion battery of claim 5, wherein the separator is formed of a sodium-ion-selective membrane.

7. The radical-ion battery of claim 1, wherein the discharging half reaction is carried out as a two-phase process.

8. The radical-ion battery of claim 1, wherein the first anionic electrode is an electrically conductive housing that defines a chamber for retaining the electrolyte, and further wherein the second anionic electrode is a sparger that is electrically isolated from the conductive housing.

9. The radical-ion battery of claim 1, further comprising:
   a storage container that is configured to store the first free radicals, wherein the storage container is placed underground.

10. The radical-ion battery of claim 9, wherein the second free radicals are $NO_2$ molecules, and further wherein boiling point elevation additives are dissolved in liquefied $NO_2$ in the storage container.

11. The radical-ion battery of claim 1, wherein the electrolyte is a mixed cation electrolyte.

12. The radical-ion battery of claim 11, wherein the electrochemical cell further comprises:
   a first cationic electrode; and
   a second cationic electrode, wherein the first cationic electrode and the second cationic electrode are selectively activated during the charging half-reaction and the discharging half-reaction to maintain a substantially constant mole fraction of constituent cations in the mixed cation electrolyte.

13. A radical-ion battery comprising:
   an electrochemical cell, the electrochemical cell comprises:
   an electrolyte;
   first free radicals in liquid form;
   second free radicals in gaseous form, wherein the first free radicals are different from the second free radicals;

first anionic electrode means that is configured to source anions to the electrolyte during a discharging half reaction;

second anionic electrode means that is configured to sink anions from the electrolyte during a charging half reaction; and cationic electrode means that is configured to source cations to the electrolyte and sink cations from the electrolyte.

14. The radical-ion battery of claim 13, the electrochemical cell further comprising separator means positioned between the electrolyte and the first free radicals.

* * * * *